(12) United States Patent
Smith et al.

(10) Patent No.: US 11,548,428 B2
(45) Date of Patent: Jan. 10, 2023

(54) GEARED RAMP ASSEMBLY WITH RAISED RAMP POSITION AND SIDE RAILS AND METHOD OF USE

(71) Applicant: The Braun Corporation, Winamac, IN (US)

(72) Inventors: Adam Smith, Indianapolis, IN (US); Justin M. Kline, Westfield, IN (US)

(73) Assignee: The Braun Corporation, Winamac, IL (US)

( * ) Notice: Subject to any disclaimer, the term of this patent is extended or adjusted under 35 U.S.C. 154(b) by 15 days.

(21) Appl. No.: 17/094,930

(22) Filed: Nov. 11, 2020

(65) Prior Publication Data

US 2021/0170933 A1 Jun. 10, 2021

Related U.S. Application Data

(60) Provisional application No. 63/026,777, filed on May 19, 2020, provisional application No. 62/945,291, filed on Dec. 9, 2019.

(51) Int. Cl.
*B60P 1/43* (2006.01)
*A61G 3/06* (2006.01)

(52) U.S. Cl.
CPC ............ *B60P 1/431* (2013.01); *A61G 3/061* (2013.01); *A61G 3/067* (2016.11)

(58) Field of Classification Search
CPC .. B60P 1/43; B60P 1/431; B60P 1/435; A61G 3/067; A61G 3/061

USPC .......................................................... 414/537
See application file for complete search history.

(56) References Cited

U.S. PATENT DOCUMENTS

| | | | |
|---|---|---|---|
| 5,636,399 A | 6/1997 | Trombley | |
| 5,775,232 A * | 7/1998 | Golemis | B61D 23/025 105/458 |
| 6,470,523 B1 | 10/2002 | Sardonico | |
| 7,052,227 B2 * | 5/2006 | Navarro | B60P 1/431 414/537 |
| 2006/0245883 A1 * | 11/2006 | Fontaine | A61G 3/067 414/537 |
| 2011/0008140 A1 * | 1/2011 | Hansen | A61G 3/067 414/812 |
| 2011/0027054 A1 * | 2/2011 | Hansen | A61G 3/061 414/523 |
| 2012/0030886 A1 * | 2/2012 | Persson | B60R 3/02 14/71.1 |
| 2021/0000666 A1 * | 1/2021 | Smith | A61G 3/061 |

* cited by examiner

*Primary Examiner* — Glenn F Myers
(74) *Attorney, Agent, or Firm* — Daniel Tallitsch

(57) ABSTRACT

A ramp assembly to accommodate a wheel-chaired passenger to enter or exit a motorized vehicle having a conventional floor includes a frame and a ramp. The ramp is slidably coupled to the frame. The ramp assembly further includes a drive block configured to translate longitudinally along the track system. The ramp assembly further includes a wheel pivotally coupled to the ramp. The wheel has a longitudinal axis and is rotatably coupled to the drive block or the frame for rotation about the longitudinal axis to move the ramp between a raised position and a lowered position.

18 Claims, 17 Drawing Sheets

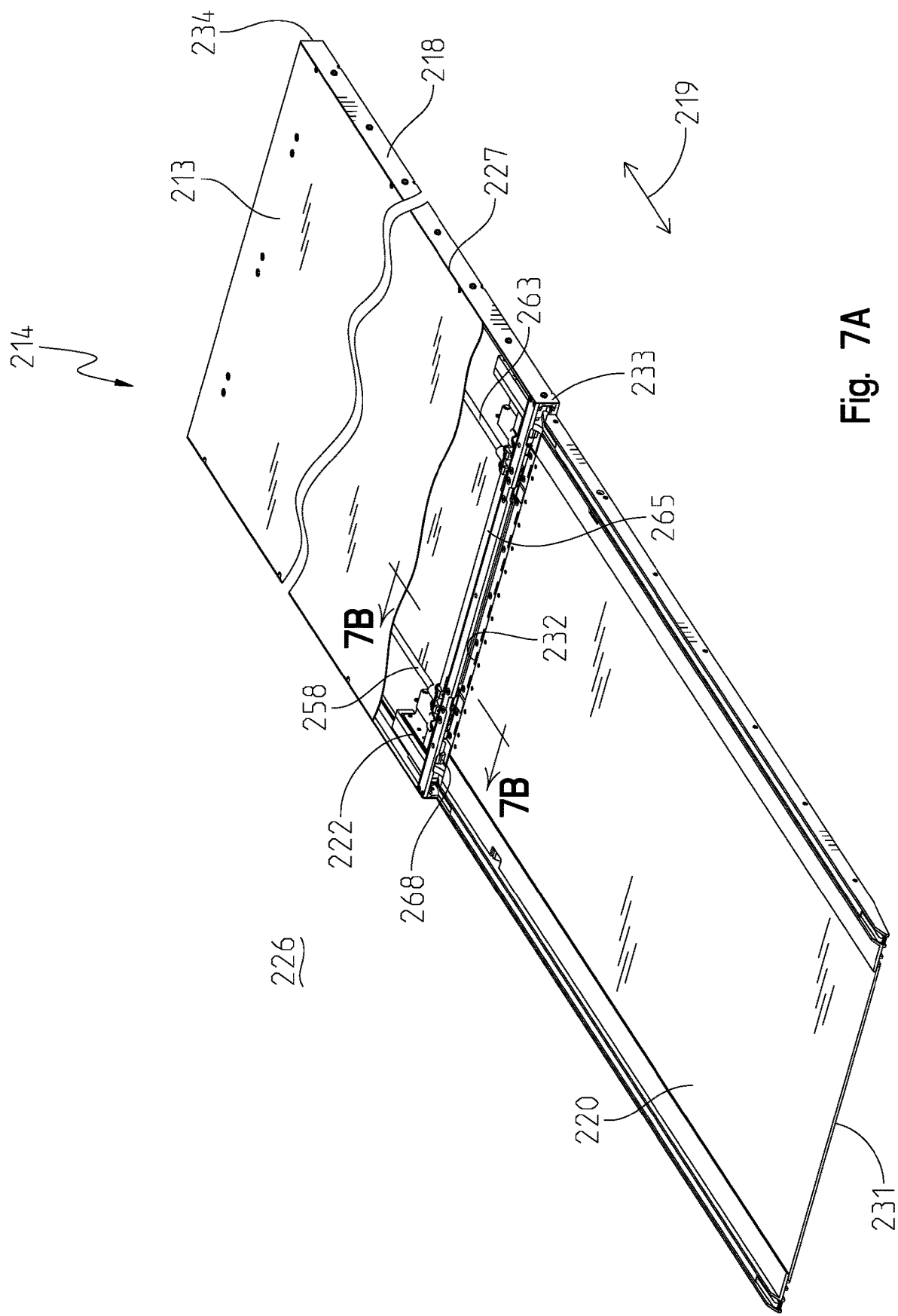

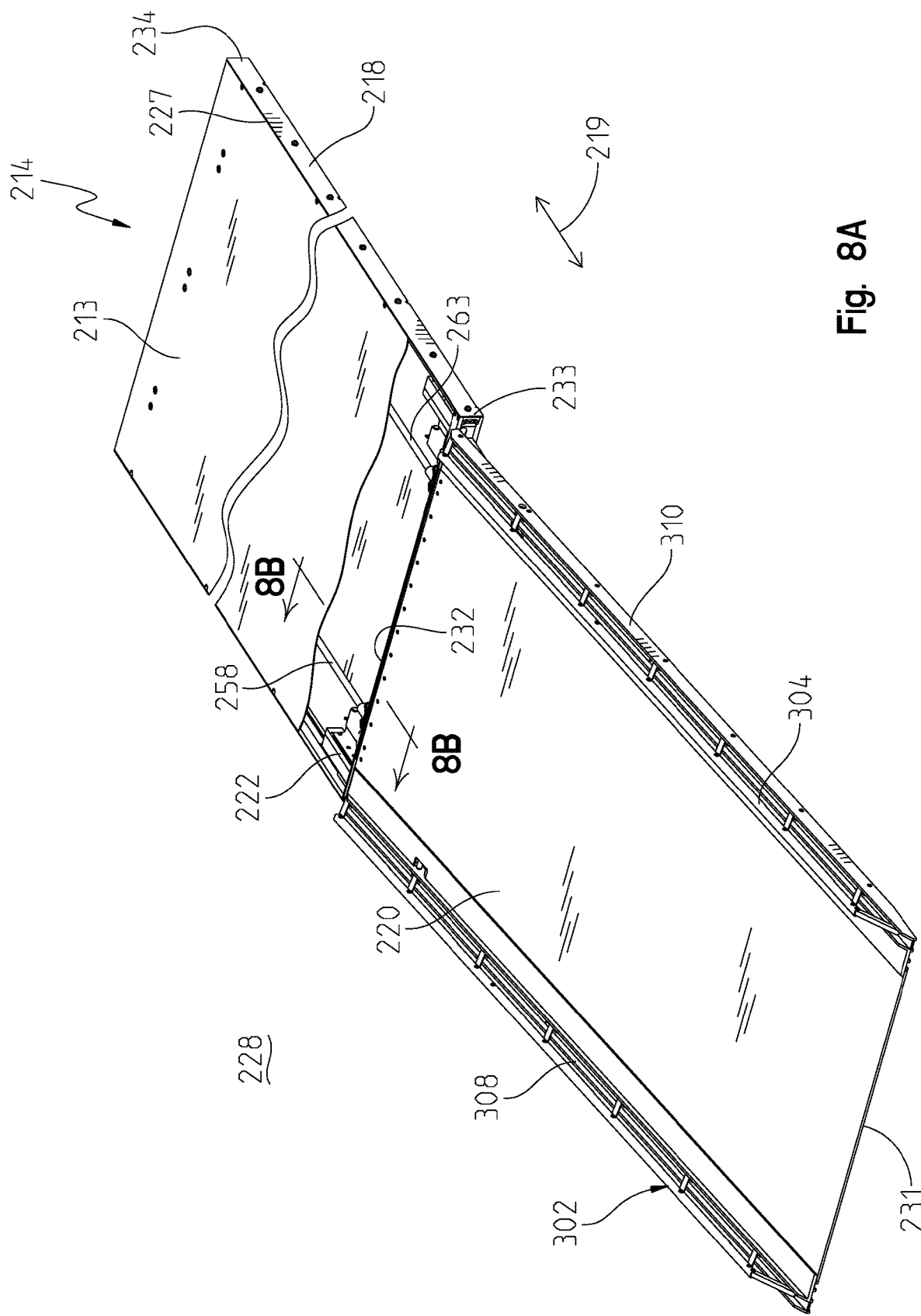

GEARED RAMP ASSEMBLY WITH RAISED RAMP POSITION AND SIDE RAILS AND METHOD OF USE

RELATED APPLICATIONS

The present application claims the benefit of U.S. Provisional Patent Application Ser. No. 63/026,777, filed May 19, 2020, entitled "Geared Ramp Assembly with Raised Ramp Position and Side Rails and Method of Use", and U.S. Provisional Patent Application Ser. No. 62/945,291, filed Dec. 9, 2019, entitled "Geared Ramp Assembly with Raised Ramp Position and Method of Use", the disclosures of which are hereby incorporated by reference in their entirety.

FIELD OF THE DISCLOSURE

The present application relates to a passenger vehicle for transporting one or more passengers, and more particularly to a ramp assembly movable to a raised position for accommodating ingress and egress of a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified altering or adding certain parts or structures within a vehicle to accommodate the physically limited passenger without inconveniencing other passengers or sacrificing space in the vehicle. For example, in one configuration, a van or bus is retrofitted with a ramp to enable a physically limited individual using a wheelchair to enter and exit the vehicle.

In some instances, the ramp is stored below the conventional vehicle floor and deploys to accommodate entry and exit of the physically limited individual through a side door or entrance of the vehicle. Challenges may arise related to stowing the ramp and ensuring that the ramp is flush with the conventional vehicle floor when the ramp is deployed.

SUMMARY

In a first embodiment of the disclosure, a ramp assembly to accommodate a wheel-chaired passenger to enter or exit a motorized vehicle having a conventional floor includes a ramp, a drive block, and a wheel. The frame includes a top edge, a bottom edge, a front end, a rear end spaced longitudinally apart from the front end, and a track system extending longitudinally between the front end and the rear end of the frame. The ramp is slidably coupled to the frame and includes a front end and a rear end. The drive block is configured to translate longitudinally along the track system. The wheel is pivotally coupled to the ramp, has a longitudinal axis, and is rotatably coupled to the drive block for rotation about the longitudinal axis.

In some embodiments, the ramp is configured to raise and lower relative to the wheel when the wheel is rotated about the longitudinal axis. The ramp assembly may further include a hinge having a first end coupled to the wheel and a second end coupled to the rear end of the ramp, wherein the first end is configured to pivot relative to the second end to facilitate pivoting movement of the ramp relative to the wheel.

In some embodiments, the wheel is rotatable between a first position in which the rear end of the ramp is positioned below the top edge of the frame, and a second position in which the rear end of the ramp is positioned above the top edge of the frame. In some embodiments, the ramp assembly further comprises a toothed-mount coupled to the front end of the frame, wherein the wheel is a toothed-wheel configured to rotate about the longitudinal axis when the toothed-wheel is in contact with the toothed-mount.

In some embodiments, the toothed-wheel is rotatable between a first position in which the rear end of the ramp is positioned below the toothed-mount, and a second position in which the rear end of the ramp is positioned above the toothed-mount. The ramp is movable between: (i) a stowed position in which the wheel is spaced apart from the front end of the frame, (ii) a lowered position in which the wheel is positioned at the front end of the frame, (iii) and a raised position in which the wheel is positioned at the front end of the frame and rotated relative to the wheel when the ramp is in the lowered position. In the stowed position the ramp is positioned inside the motorized vehicle and beneath the conventional floor. In the lowered position the ramp is positioned outside the motorized vehicle and the rear end of the ramp is positioned below the conventional floor. In the raised position the ramp is positioned outside the motorized vehicle and the rear end of the ramp is positioned flush with the conventional floor.

In some embodiments, the track system includes: a first-side track, a second-side track spaced apart from the first-side track, and an opening defined between the first-side track and the second-side track sized to receive the ramp. In some embodiments, the ramp assembly includes a mount coupled to the first-side track and the second-side track, wherein the mount further defines the opening sized to receive the ramp. In some embodiments, the ramp assembly further includes a first bearing coupled to the mount; a second bearing positioned at the rear end of the frame; a threaded-rod extending between and configured to rotate relative to the first bearing and the second bearing; and a threaded-casing fixedly coupled to the drive block and configured to translate longitudinally along the threaded-rod during rotation of the threaded-rod. In some embodiments, the wherein the wheel is rotatable between a first position in which the rear end of the ramp is aligned with the opening, and a second position in which the rear end of the ramp is positioned above the mount.

In another embodiment of the disclosure, a ramp assembly for a motorized vehicle having a conventional floor includes a frame and a ramp. The frame includes a front end, a rear end spaced longitudinally apart from the front end, and a track system extending longitudinally between the front end and the rear end of the frame. The ramp is slidably coupled to the frame and includes a front end and a rear end. The ramp assembly further includes a drive block configured to translate longitudinally along the track system; a first cog coupled to the frame; a second cog coupled to the drive block for longitudinal movement therewith. One of the first cog and the second cog is a toothed-wheel pivotally coupled to the ramp, and the other of the first cog and the second cog is a toothed-bar configured to engage the toothed-wheel to cause rotation of the toothed-wheel.

In some embodiments, the ramp is configured to pivot relative to the toothed-wheel during rotation of the toothed-wheel. In some embodiments, the track system includes a first-side track and a second-side track, and the toothed-wheel is rotatable between: a first position in which the rear end of the ramp is positioned above the frame, and a second position in which the rear end of the ramp is vertically aligned with an opening of the frame defined between the first-side track and the second-side track.

In some embodiments, the ramp is movable between: (i) a stowed position in which the second cog is spaced apart from the first cog, (ii) a lowered position in which the second cog is in contact with the first cog, (iii) and a raised position in which the second cog is in contact with the first cog and the toothed-wheel is rotated relative to the toothed-wheel when the ramp is in the lowered position. In the stowed position the ramp is positioned inside the motorized vehicle and beneath the conventional floor. In the lowered position the rear end of the ramp is positioned below the conventional floor. In the raised position the ramp is positioned outside the motorized vehicle and the rear end of the ramp is positioned flush with the conventional floor.

In some embodiments, the ramp is movable between: (i) a stowed position in which the second cog is spaced apart from the front end of the frame, (ii) a lowered position in which the second is positioned at the front end of the frame, (iii) and a raised position in which the second cog is positioned at the front end of the frame and the toothed-wheel is rotated relative to the toothed-wheel when the ramp is in the lowered position.

In another embodiment of the disclosure, a method of moving a ramp relative to a conventional floor of a motorized vehicle includes: sliding a rear end of the ramp from a rear end to a front end of a frame that is positioned beneath the conventional floor; and pivoting the rear end of the ramp relative to the frame from first position in which the rear end of the ramp is below the conventional floor to a second position in which the rear end of the ramp is flush with the conventional floor.

In some embodiments, sliding a rear end of the ramp from a rear end to a front end of a frame includes engaging a first cog with a second cog. In some embodiments, pivoting the rear end of the ramp relative to the frame includes rotating the one of the first cog and second cog relative to the other of the first cog and second cog.

In a further embodiment of the present disclosure, a ramp assembly is configured to accommodate a wheel-chaired passenger to enter or exit a motorized vehicle. The motorized vehicle has a conventional floor. The ramp assembly comprises: a frame including a top edge, a bottom edge, a front end, a rear end spaced longitudinally apart from the front end, and a track system extending longitudinally between the front end and the rear end of the frame; a ramp slidably coupled to the frame and including a front end and a rear end; a drive block configured to move longitudinally along the track system; and a wheel pivotally coupled to the ramp; wherein the wheel has a longitudinal axis and is rotatably coupled to the drive block for rotation about the longitudinal axis.

In some embodiments, the ramp is configured to be raised and lowered relative to the wheel when the wheel is rotated about the longitudinal axis. In some embodiments, the ramp assembly includes a hinge having a first end coupled to the wheel and a second end coupled to the rear end of the ramp, wherein the first end of the hinge is configured to pivot relative to the second end of the hinge to facilitate pivoting movement of the ramp relative to the wheel.

In some embodiments, the wheel is rotatable between: a first position in which the rear end of the ramp is positioned below the top edge of the frame, and a second position in which the rear end of the ramp is positioned above the top edge of the frame.

In some embodiments, the ramp assembly further comprises a cross bar coupled to the front end of the frame, wherein the cross bar includes a toothed portion; wherein the wheel is a toothed wheel configured to rotate about the longitudinal axis when in contact with the toothed portion of the cross bar. In some embodiments, the toothed wheel is rotatable between: a first position in which the rear end of the ramp is positioned below the toothed mount, and a second position in which the rear end of the ramp is positioned above the toothed mount.

In some embodiments, the ramp is movable between: (i) a stowed position in which the wheel is spaced apart from the front end of the frame, (ii) a lowered position in which the wheel is positioned at the front end of the frame, (iii) and a raised position in which the wheel is positioned at the front end of the frame and rotated relative to the wheel when the ramp is in the lowered position.

In some embodiments, in the stowed position the ramp is positioned inside the motorized vehicle and beneath the conventional floor, in the lowered position the ramp is positioned outside the motorized vehicle and the rear end of the ramp is positioned below the conventional floor, and in the raised position the ramp is positioned outside the motorized vehicle and the rear end of the ramp is positioned flush with the conventional floor.

In some embodiments, the track system includes: a first-side track coupled a first side of the frame, a second-side track spaced apart from the first-side track and coupled to a second side of the frame, and an opening defined between the first-side track and the second-side track sized to receive the ramp. In some embodiments, the ramp assembly includes a cross bar coupled to the first side of the frame and the second side of the frame, wherein the cross bar further defines the opening sized to receive the ramp.

In some embodiments the ramp assembly comprises: a first bearing coupled to the cross bar; a second bearing positioned at the rear end of the frame; a threaded rod extending between and configured to rotate relative to the first bearing and the second bearing; and a threaded casing fixed relative to the drive block and configured to move longitudinally along the threaded rod during rotation of the threaded rod. In some embodiments, the wheel is rotatable between: a first position in which the rear end of the ramp is aligned with the opening, and a second position in which the rear end of the ramp is positioned above the cross bar.

In another illustrative embodiment, a ramp assembly for a motorized vehicle having a conventional floor comprises: a frame including a front end, a rear end spaced longitudinally apart from the front end, and a track system extending longitudinally between the front end and the rear end of the frame; a ramp slidably coupled to the frame and including a front end and a rear end; a drive block configured to translate longitudinally along the track system; a first cog coupled to the frame; and a second cog coupled to the drive block for longitudinal movement therewith, wherein one of the first cog and the second cog is a toothed wheel pivotally coupled to the ramp, and the other of the first cog and the second cog is a toothed bar configured to engage the toothed wheel to cause rotation of the toothed wheel.

In some embodiments, the ramp is configured to be raised and lowered relative to the toothed wheel during rotation of the toothed wheel. In some embodiments, the track system includes a first-side track and a second-side track, and the toothed wheel is rotatable between: a first position in which the rear end of the ramp is positioned above the frame, and a second position in which the rear end of the ramp is vertically aligned with an opening of the frame defined between the first-side track and the second-side track.

In some embodiments, the ramp is movable between: (i) a stowed position in which the second cog is spaced apart from the first cog, (ii) a lowered position in which the second cog is in contact with the first cog, (iii) and a raised position in which the second cog is in contact with the first cog and the toothed wheel is rotated relative to the toothed wheel when the ramp is in the lowered position.

In some embodiments, in the stowed position the ramp is positioned inside the motorized vehicle and beneath the conventional floor, in the lowered position the rear end of the ramp is positioned below the conventional floor, and in the raised position the ramp is positioned outside the motorized vehicle and the rear end of the ramp is positioned flush with the conventional floor.

In some embodiments, the ramp is movable between: (i) a stowed position in which the second cog is spaced apart from the rear end of the frame, (ii) a lowered position in which the second is positioned at the rear end of the frame, (iii) and a raised position in which the second cog is positioned at the rear end of the frame and the toothed wheel is rotated relative to the toothed wheel when the ramp is in the lowered position.

In another illustrative embodiment, a method of moving a ramp relative to a conventional floor of a motorized vehicle comprises: sliding a rear end of the ramp from a rear end to a front end of a frame that is positioned beneath the conventional floor; and adjusting the height of the rear end of the ramp relative to the frame from first position in which the rear end of the ramp is below the conventional floor to a second position in which the rear end of the ramp is flush with the conventional floor.

In some embodiments, sliding a rear end of the ramp from a rear end to a front end of a frame includes engaging a first cog with a second cog; and adjusting the height of the rear end of the ramp relative to the frame includes rotating the one of the first cog and second cog relative to the other of the first cog and second cog.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 7A is a perspective view of the ramp assembly showing the ramp in a lowered position below the conventional floor of the passenger vehicle;

FIG. 8A is a perspective view of the ramp assembly showing the ramp in a raised position flush with the conventional floor of the passenger vehicle;

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
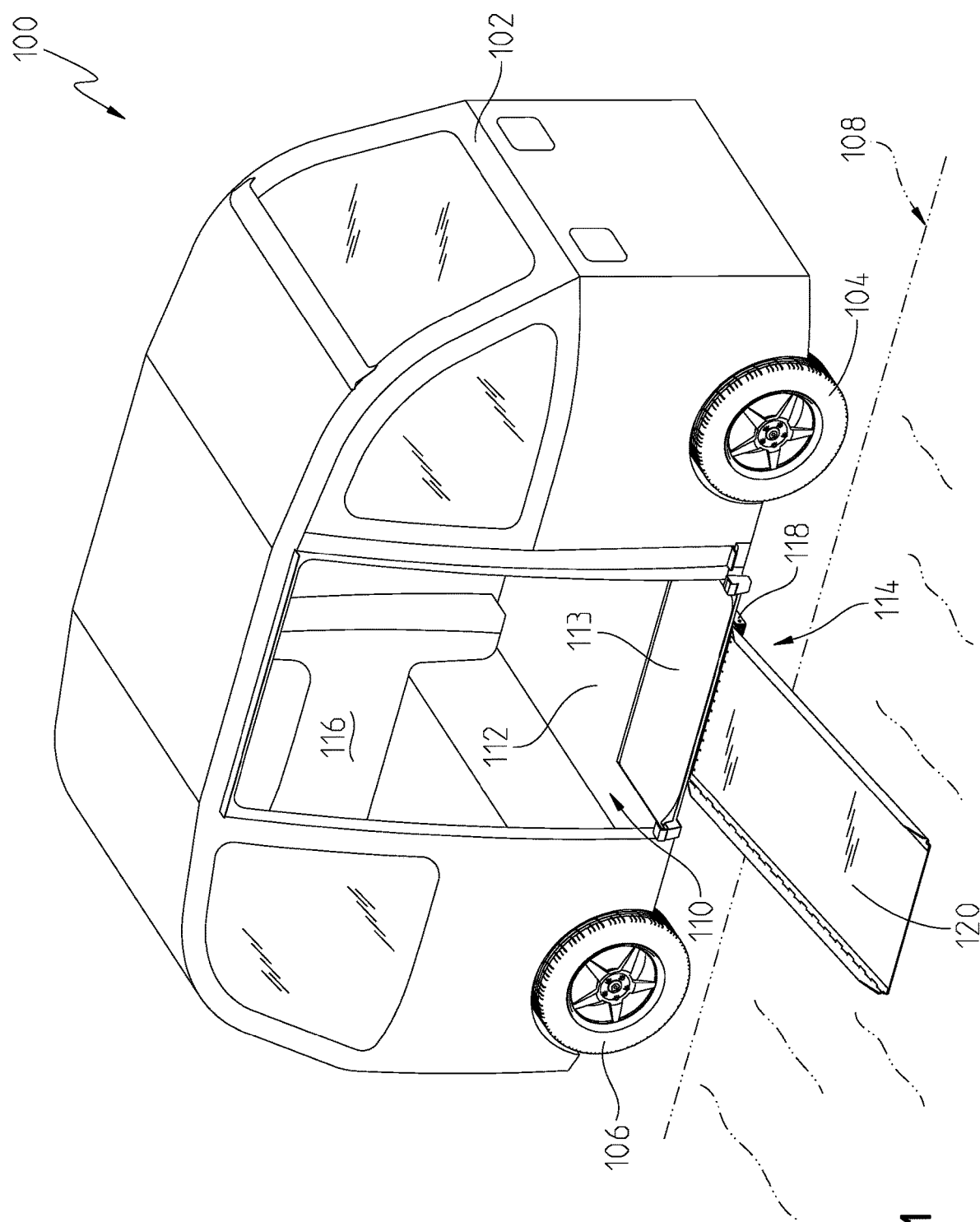
FIG. 1 is a perspective view of a passenger vehicle including a movable ramp.

FIG. 1 illustrates a vehicle 100, commonly identified as a passenger van or bus, available from any number of United States and foreign manufacturers. The vehicle may be a single-level bus, a double-decker bus, or any other type of vehicle. The principles and teachings of the present disclosure may be used for any type of vehicle.

In the illustrative embodiment shown in FIG. 1, the vehicle 100 includes a unibody construction, but other vehicles having a frame on body construction are also included in the present disclosure. Consequently, the use of vehicle herein includes all types and kinds of vehicles with a body on frame construction, a unibody construction, or other constructions. In addition, while the passenger van 100 is illustrated in FIG. 1, the present disclosure is directed to all passenger vehicles carrying one or more passengers including, but not limited to, a bus, motor coach, sport-utility vehicle, truck, taxi, ambulance, or passenger car.

The vehicle 100 includes a frame or chassis 102 operatively coupled to a first pair of wheels 104 and a second pair wheels 106 that propel the vehicle 100 along a ground surface 108. In the illustrative embodiment, the vehicle is shown as a bi-directional vehicle; however, it should be appreciated that in other examples, the vehicle may be one of any number of vehicles suitable for use with the ramp assembly 114 described below. A first passenger opening 110 is located between the first pair wheels 104 and the second pair of wheels 106, and provides access to a passenger for sitting or standing in the vehicle 100. The passenger opening 110 may be modified to increase the size of the opening 110 to provide access, for example, to a passenger seated in a wheelchair to enter and exit the vehicle 100. The vehicle 100 may include a conventional floor 112 extending throughout the vehicle 100 to support passengers and other objects traveling in the vehicle 100.

As shown in FIG. 1, the vehicle 100 may be further modified to include the ramp assembly 114 which provides rolling access of a wheelchair from the ground surface 108 into an interior 116 of the vehicle 100. Prior to deployment, the ramp assembly 114 is positioned adjacent the opening 110 and beneath the conventional floor 112 of the vehicle 100. In other examples, prior to deployment, the ramp assembly 114 is positioned partially beneath a modified portion 113 of the conventional floor 112, and the modified portion 113 is flush with the remainder of the conventional floor 112. In other examples, the modified portion 113 may be sloped such that at least one (but not all) sides of the modified portion 113 are flush with the conventional floor 112. When the ramp 120 is described herein as being "flush with the conventional floor" the phrase is meant to cover each illustrative example of a conventional and/or modified-conventional floor herein. Additionally, as used herein "beneath" means directly underneath while "below" means at a lower height but not necessarily underneath.

Figure 2A:
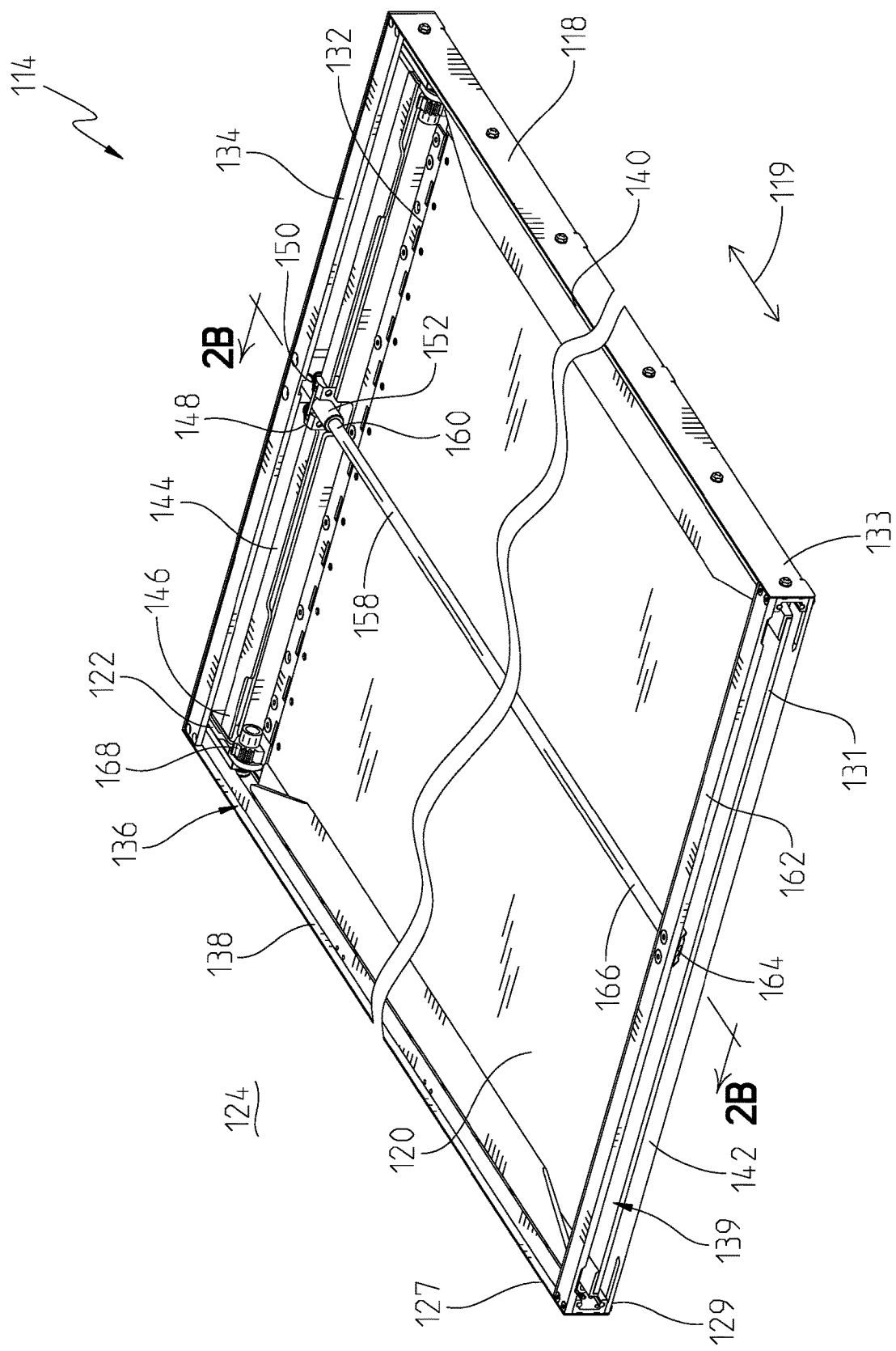
FIG. 2A is a perspective view of a ramp assembly showing a ramp in a stowed position beneath a conventional floor of the passenger vehicle.
Figure 2B:
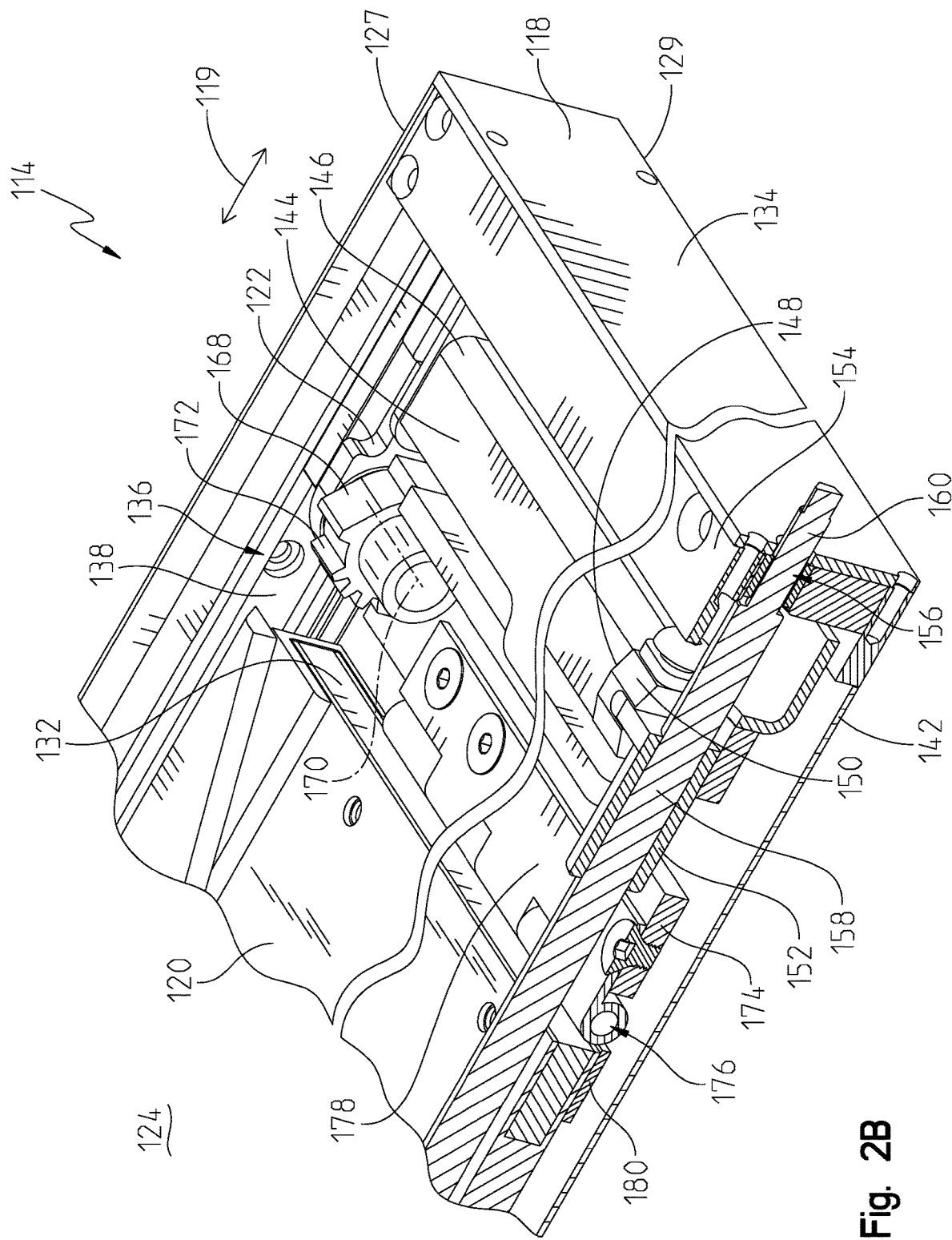
FIG. 2B is a partial cross-section view of the ramp assembly of FIG. 2A showing the ramp engaged with a track system of a frame.

As shown in FIGS. 2A-B, the ramp assembly 114 includes a frame 118, a ramp 120 movable relative to the frame 118 and a drive block 122 coupled between the frame 118 and the ramp 120. The drive block may translate to force sliding for movement of the ramp 120 relative to the frame 118. As will be described below in greater detail below, the ramp 120 is movable between several positions including a stowed position 124, a lowered position 126, and a raised position 128. As suggested by FIGS. 2A-B, in the stowed position 124, the ramp 120 is positioned in the interior 116 the vehicle 100 and beneath the conventional floor 112. As suggested by FIGS. 3A-B, in the lowered position 126, the ramp 120 is positioned outside the vehicle 100 and a rear end 132 of the ramp 120 is positioned below the conventional floor 112. As suggested by FIGS. 4A-B, in the raised position 128, the ramp 120 is positioned outside the vehicle 100 and the rear end 132 of the ramp 120 is positioned flush with the conventional floor 112 while a front end 131 of the ramp 120 rests on the ground.

Referring now to FIGS. 2A-B, the frame 118 includes a top edge 127, a bottom edge 129, a front end 133, a rear end 134, and a track system 136. The rear end 134 of the frame 118 is spaced longitudinally apart from the front end 133, and the track system 136 extends longitudinally between the front end 133 and the rear end 134 of the frame 118. The longitudinal direction is indicated by arrow 119. The track system 136 includes a first-side track 138, a second-side track 140, and a frame floor 142 extending between the first-side track 138 and the second-side track 140. While the frame floor 142 is shown in FIG. 2B, the ramp 120 eclipses the frame floor 142 in FIG. 2A.

An opening 139 is defined between the first-side track 138 and the second-side track 140. The ramp 120 may pass through the opening 139 as the ramp 120 is moved from the stowed position 124 to the lowered position 126. As such, the opening 139 is sized to receive the ramp 120 and facilitate passage of the ramp 120 therethrough. In some embodiments, the frame floor 142 supports the ramp 120 as the ramp 120 is moved between the stowed position 124 and the lowered position 126. It should be understood that in the illustrative embodiment the first-side track 138 and the second-side track 140 are a mirror image of one another and are otherwise identical such that description of a side track herein applies equally to both the first-side track 138 and the second-side track 140 of the track system 136.

In some embodiments, the ramp assembly 114 includes a pair of rollers (not shown) coupled to the drive block 122 for rotation relative to the drive block 122. The rollers are sized and shaped to be positioned within and supported by the first-side track 138. Rolling movement of the rollers along the first-side track 138 facilitates sliding movement of the ramp 120 relative to the frame 118.

As shown in FIG. 2B, in some embodiments, the ramp assembly 114 includes an elongated mount 144 fixed to the drive block 122 for sliding movement with the drive block 122 relative to the frame 118 in the longitudinal direction 119. In such embodiments, the elongated mount 144 extends from the drive block 122 away from the first-side track 138 toward the second-side track 140. The elongated mount 144 includes a first end 146 coupled to the drive block 122 and a second end 148 coupled to a casing-mount 150. As shown in FIGS. 2A-B, the casing-mount 150 is coupled to and supports a threaded-casing 152. In some embodiments, one or more of the threaded-casing 152, the casing mount 150, and the elongated mount 144 are formed as a single monolithic component. In other embodiments, each piece may be formed separately and later assembled. In either case, the frame 118 includes a first support mount 154 and a first bearing 156 each positioned at the front end 134 of the frame 118.

As shown in FIGS. 2A-B, the first support mount 154 is coupled to the top edge 127 of the frame 118 and extends from the first-side track 138 to the second-side track 140. The first bearing 156 is coupled to and supported by the support mount 154. The ramp assembly 114 further includes a threaded-rod 158 extending the front end of the frame 118 to the rear end of the frame 118. The threaded-rod 158 includes a first end 160 with a portion thereof positioned in the first bearing 156. The first bearing 156 is configured to support and facilitate rotation of the threaded-rod 158. The first end 160 of the threaded-rod 158 may be coupled to a rotational power supply (not shown) to cause rotation of the threaded-rod 158. The threaded-rod 158 may be positioned within and threadingly coupled to the threaded-casing 152, such that rotation of the thread-rod 158 causes the threaded-casing 152 to translate longitudinally along the threaded-rod 158. Longitudinal movement of the thread-casing 152 causes sliding movement of the drive block 122, which is indirectly coupled to the threaded-casing 152 as described above.

Figure 3A:
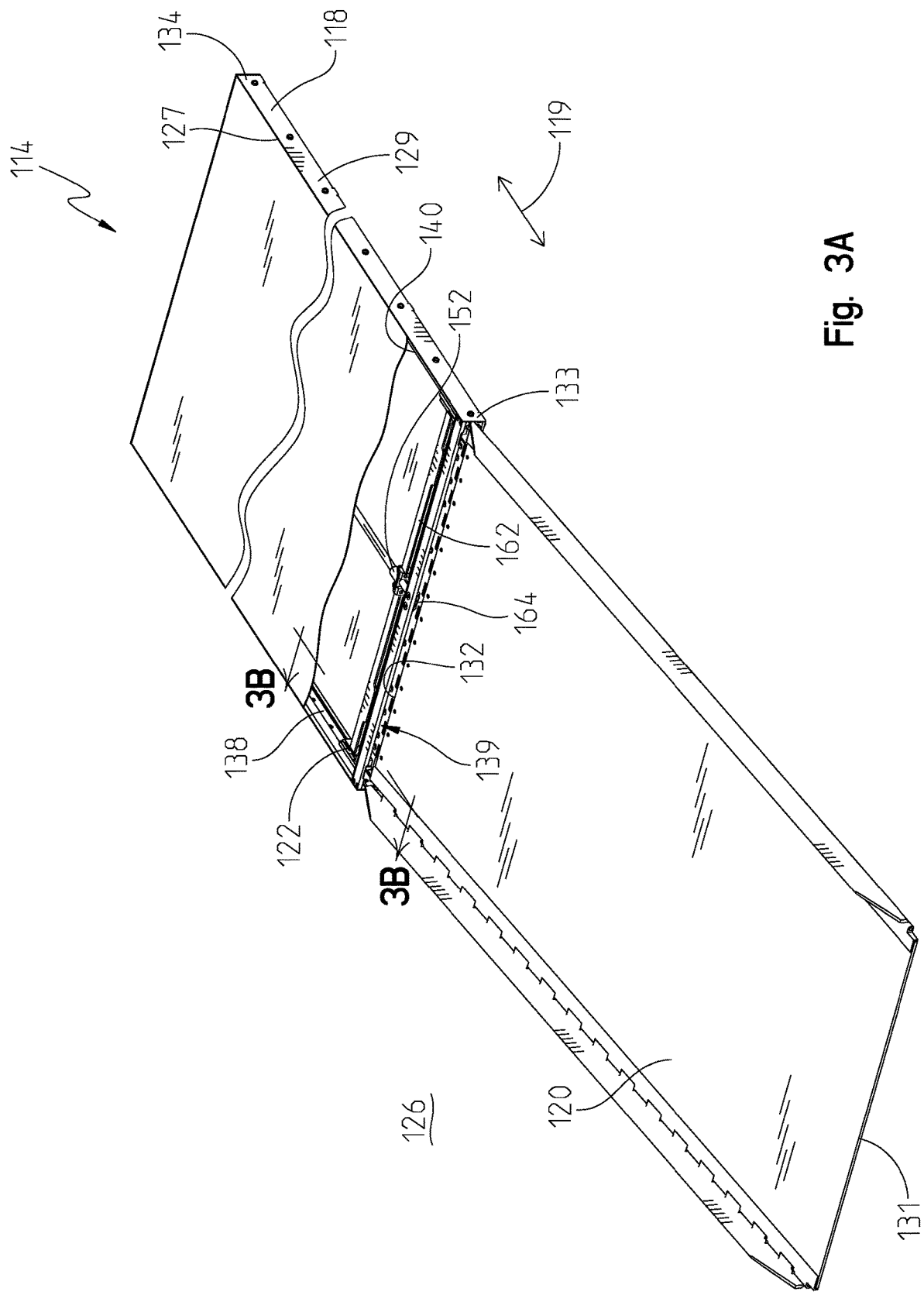
FIG. 3A is a perspective view of the ramp assembly showing the ramp in a lowered position below the conventional floor of the passenger vehicle.
Figure 4A:
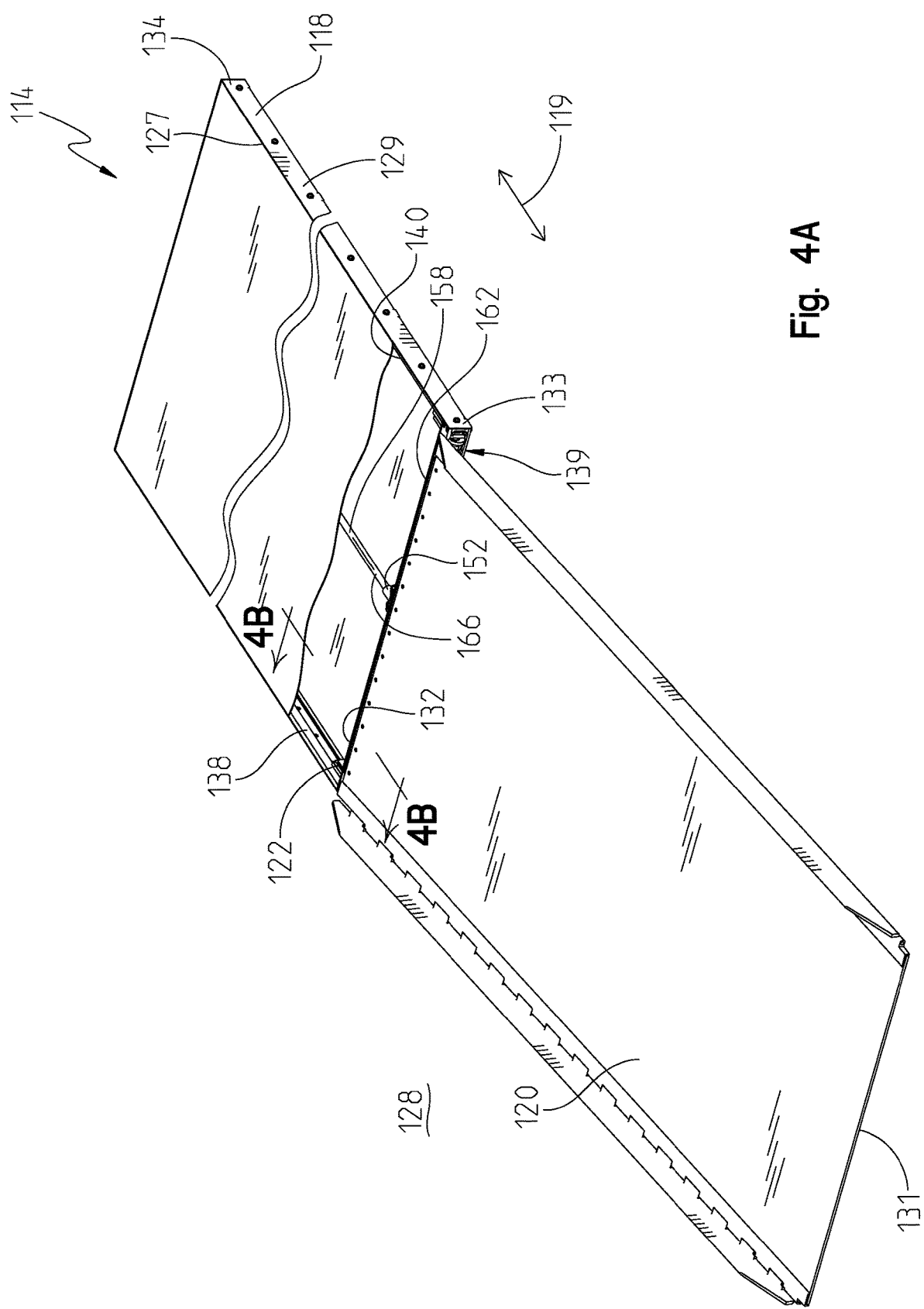
FIG. 4A is a perspective view of the ramp assembly showing the ramp in a raised position flush with the conventional floor of the passenger vehicle.

As suggested in FIGS. 2A, 3A, and 4A, the frame 118 includes a second support mount 162 and a second bearing 164 each positioned at the front end 133 of the frame 118. The second support mount 162 is coupled to the top edge 127 of the frame 118 and extends from the first-side track 138 to the second-side track 140. The second support mount 162 cooperates with the frame floor 142, the first-side track 138, and the second-side track 140 to define the opening 139. The second bearing 164 is coupled to and supported by the second support mount 162. The threaded-rod 158 includes a second end 166, and a portion of the second end 166 is positioned in the second bearing 164. The second bearing 164 is configured to support and facilitate rotation of the threaded-rod 158, which ultimately facilitates sliding movement of the drive block 122 relative to the frame 118 as described above. It should be appreciated that the drive block 122 may be translated in the longitudinal direction 119 in a number of ways including but not limited to the manner and with the mechanisms described above.

As shown in FIG. 2B, the ramp assembly 114 includes a wheel 168 coupled to the drive block 122 for rotation about a longitudinal axis 170 of the wheel 168. In the illustrative embodiment, the wheel 168 is a toothed-wheel, meaning that the wheel 168 has a plurality of projections 172 extending away from the center of the wheel 168. In the illustrative embodiment, the wheel 168 is fixed to an elongated wheel-mount 174 such that the elongated wheel-mount 174 is rotatable with the wheel 168. In some embodiments, the wheel 168 and the elongated wheel-mount 174 may be formed as a single monolithic component. In other embodiments, each piece may be formed separately and later assembled. In either case, the elongated wheel-mount 174 is coupled to a hinge 176. As shown in FIG. 2B, the hinge 176 includes a first end 178 coupled to the elongated wheel-mount 174 and a second end 180 coupled to the rear end 132 of the ramp 120. The first end 178 of the hinge 176 is configured to pivot relative to the second end 180 of the hinge 176. As a result, the ramp 120 is pivotally coupled to the wheel 168. This arrangement also facilitates sliding movement of the ramp 120 relative to the frame 118. For example, when the hinge 176 is in an opened position as shown in FIG. 2B, the hinge 176 cooperates with the elongated wheel-mount 174 and the wheel 168 to couple the ramp 120 to the drive block 122. Thus, longitudinal movement of the drive block 122 may push or pull the ramp 120 in the longitudinal direction 119 relative to the frame 118.

As shown in FIG. 2A, when the ramp 120 is in the stowed position 124, the wheel 168 is spaced apart from the front end 133 of the frame 118. As the wheel 168 is moved longitudinally from the rear end 134 of the frame 118 toward the front end 133 of the frame 118, the ramp 120 is moved from the stowed position 124 shown in FIGS. 2A-B to the lowered position 126 shown in FIGS. 3A-B. As suggested in FIGS. 3A-B, when the ramp 120 is in the lowered position 126, the wheel 168 is positioned at the front end 133 of the frame 118 and the rear end 132 of the ramp 120 is positioned below the conventional floor 112 (or the modified portion 113). It should be appreciated that when the ramp assembly 114 is secured in the vehicle 100, the conventional floor 112 (or the modified portion 113) is located at a height immediately above the second support mount 162.

Figure 3B:
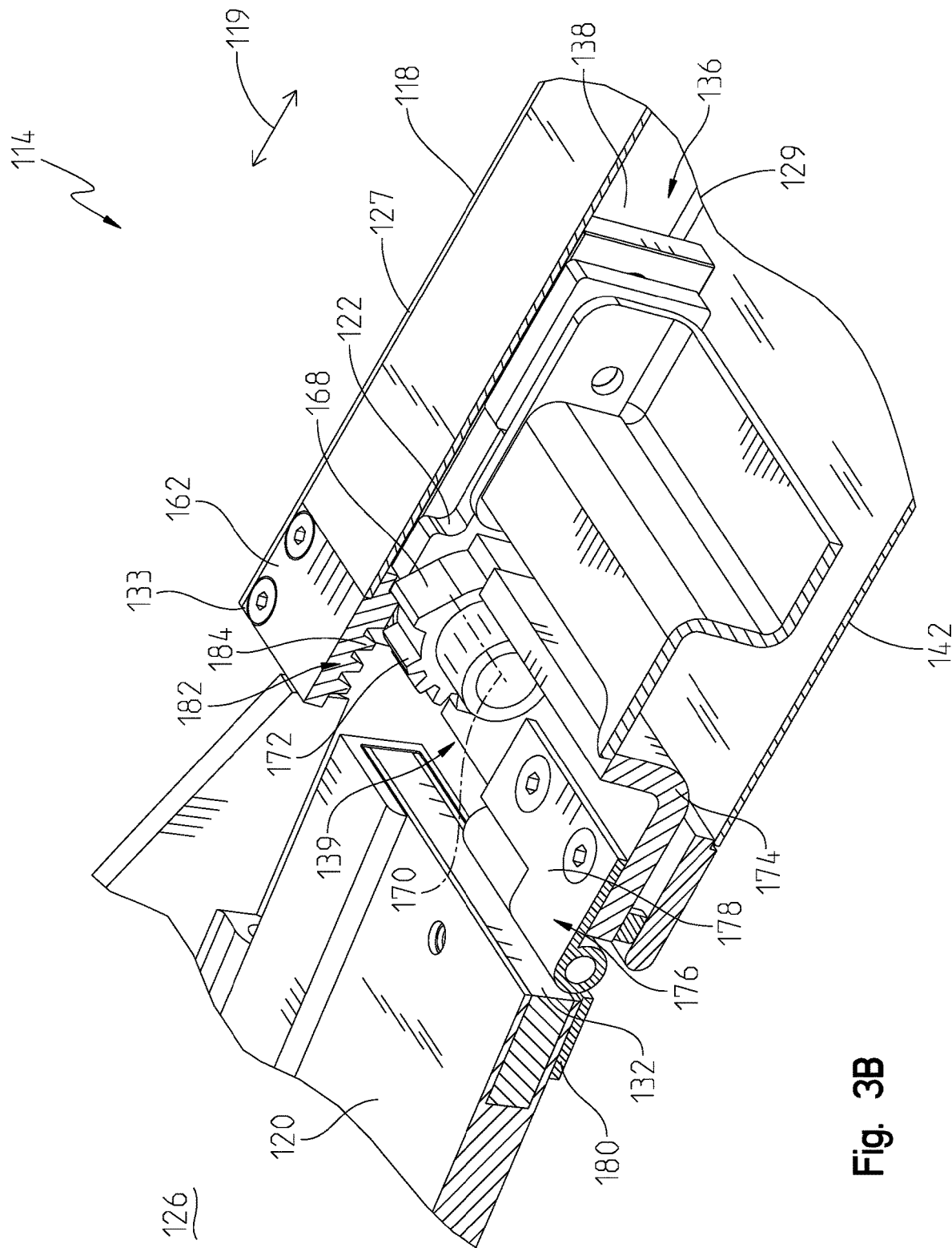
FIG. 3B is a partial cross-section view of the ramp assembly of FIG. 3A showing a toothed-wheel in contact with a toothed-bar of the frame.

As shown in FIG. 3B, the second support mount 162 includes a toothed-portion 182 having a plurality of projections 184, and therefore, the support mount 162 may be referred to as a toothed-mount 162. In some embodiments, the support mount 162 and toothed-portion 182 may be a single monolithic component. In another embodiment, the support mount 162 and the toothed-portion 182 may be formed separately and later assembled, in which case, the toothed-portion 182 may be referred to as a toothed-bar 182. In either case described above, the projections 184 may be positioned at the front end 133 of the frame 118.

Referring still to FIG. 3B, in the lowered position 126, a single projection 172 of the wheel 168 is in contact with a single projection 184 of the support mount 162. As the drive block 122 continues to slide longitudinally toward the front end 133 of the frame 118, each of the plurality projections 172 of the wheel 168 engage with each of the plurality of projections 184 of the second support mount 162 to cause rotation of the wheel 168 about the longitudinal axis 170. When the wheel 168 and the wheel-mount 174 pivot relative to the drive block 122, the hinge 176 secured to the drive block 122 moves between an open position (see FIG. 3B) and a folded position (see FIG. 4B) to raise and lower the ramp 120.

Figure 4B:
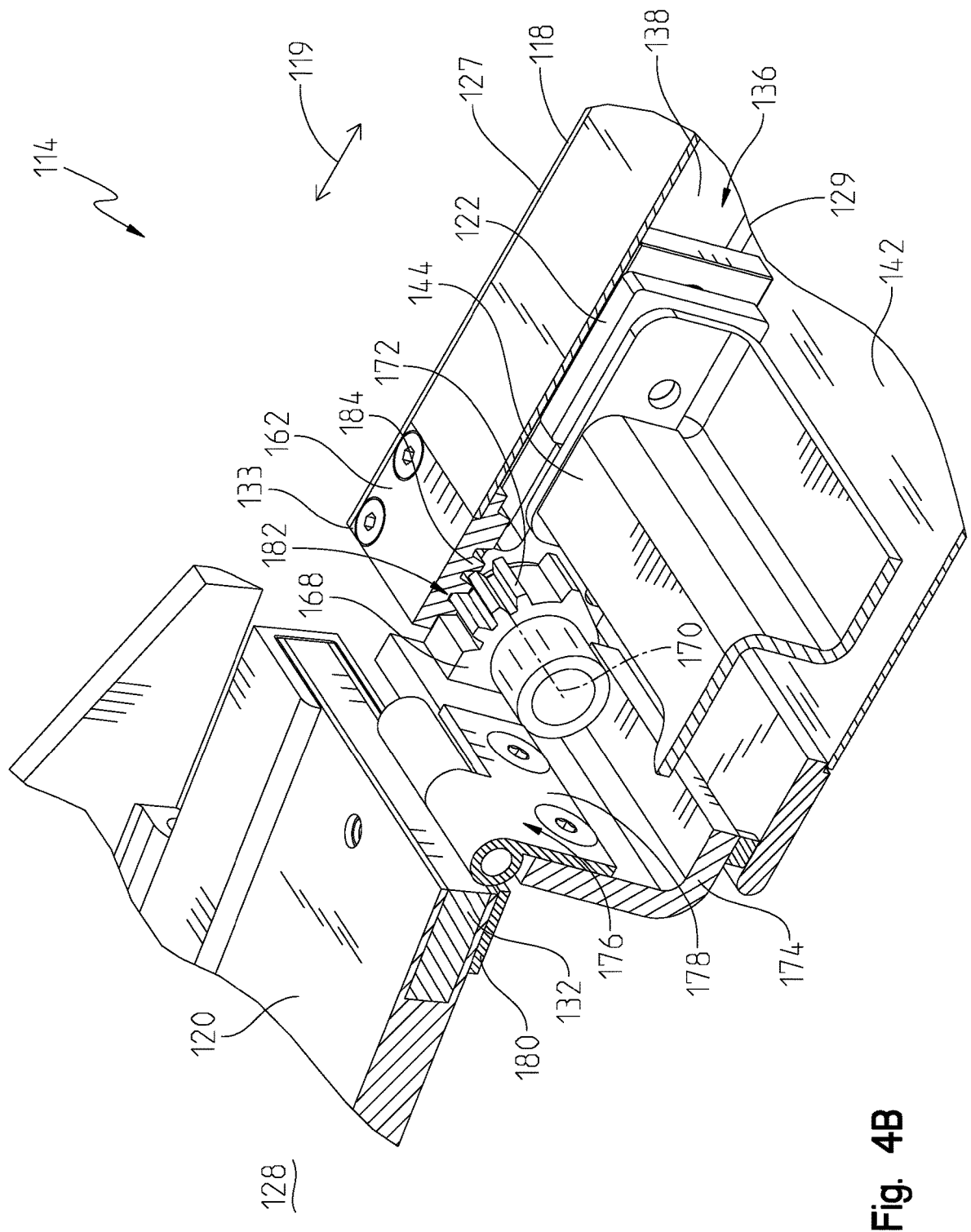
FIG. 4B is a partial cross-section view of the ramp assembly of FIG. 4A showing the toothed-wheel rotated relative to the toothed-wheel in FIG. 3B.

FIGS. 1 and 4A-B show the ramp in the raised position 128. As shown in FIG. 1, in the raised position 128, the ramp 120 is positioned outside the motor vehicle 100 and the rear end 132 of the ramp 120 is positioned flush with the conventional floor 112 (or the modified portion 113). Referring again to FIGS. 4A-B, when the ramp 120 is in the raised position 128, the wheel 168 is positioned at the front end 133 of the frame 118 and rotated relative to the position of the wheel 168 when the ramp 120 is in the lowered position 126. In other words, the wheel 168 is rotatable between a first position in which the ramp 120 is in the lowered position 126 (or the stowed position 124) and a second position in which the ramp 120 is in the raised position 128. When the wheel 168 is in the first position, the rear end 132 of the ramp 120 is positioned below the top edge 127 of the frame 118, and when the wheel 168 is in the second position, the rear end 132 of the ramp 120 is positioned above the top edge 127 of the frame 118.

In some embodiments, the wheel 168 is configured to rotate approximately 90 degrees as the ramp 120 is moved between the lowered position 126 and the raised position 128. As the wheel 168 is rotated 90 degrees, the first end 178 of the hinge 176 moves between: (i) a first position in which the first end 178 of the hinge 176 extends in a plane generally parallel to the frame floor 142, and (ii) a second position in which the first end 178 of the hinge 176 extends in a plane that is generally perpendicular to the frame floor 142.

While the description above has described the toothed-wheel 168 coupled to the drive block 122 and the toothed-bar 182 as coupled to or formed in the second support mount 162, it should be appreciated that the location of the of toothed-wheel 168 and the toothed-bar 182 may be reversed. For example, in illustrative embodiments, the toothed-bar 182 may be fixed to the drive block 122 for sliding movement therewith and the toothed-wheel 168 may be pivotally coupled to the frame 118 at a fixed location on the frame 118. As the drive block 122 slides longitudinally toward the front end 133 of the frame 118, the toothed-bar 182 slides into contact with the toothed-wheel 168. As the drive block 122 continues to slide longitudinally toward the front end 133 of the frame 118, each of the plurality of projections 184 of the toothed-bar 182 engage with each of the plurality of projections 172 of the toothed-wheel 168 to cause rotation of the toothed-wheel 168. In such an embodiment, rotation of the toothed-wheel 168 causes the hinge 176 to move between an open and a folded position to raise and lower the ramp 120 relative to the frame 118.

Figure 5:
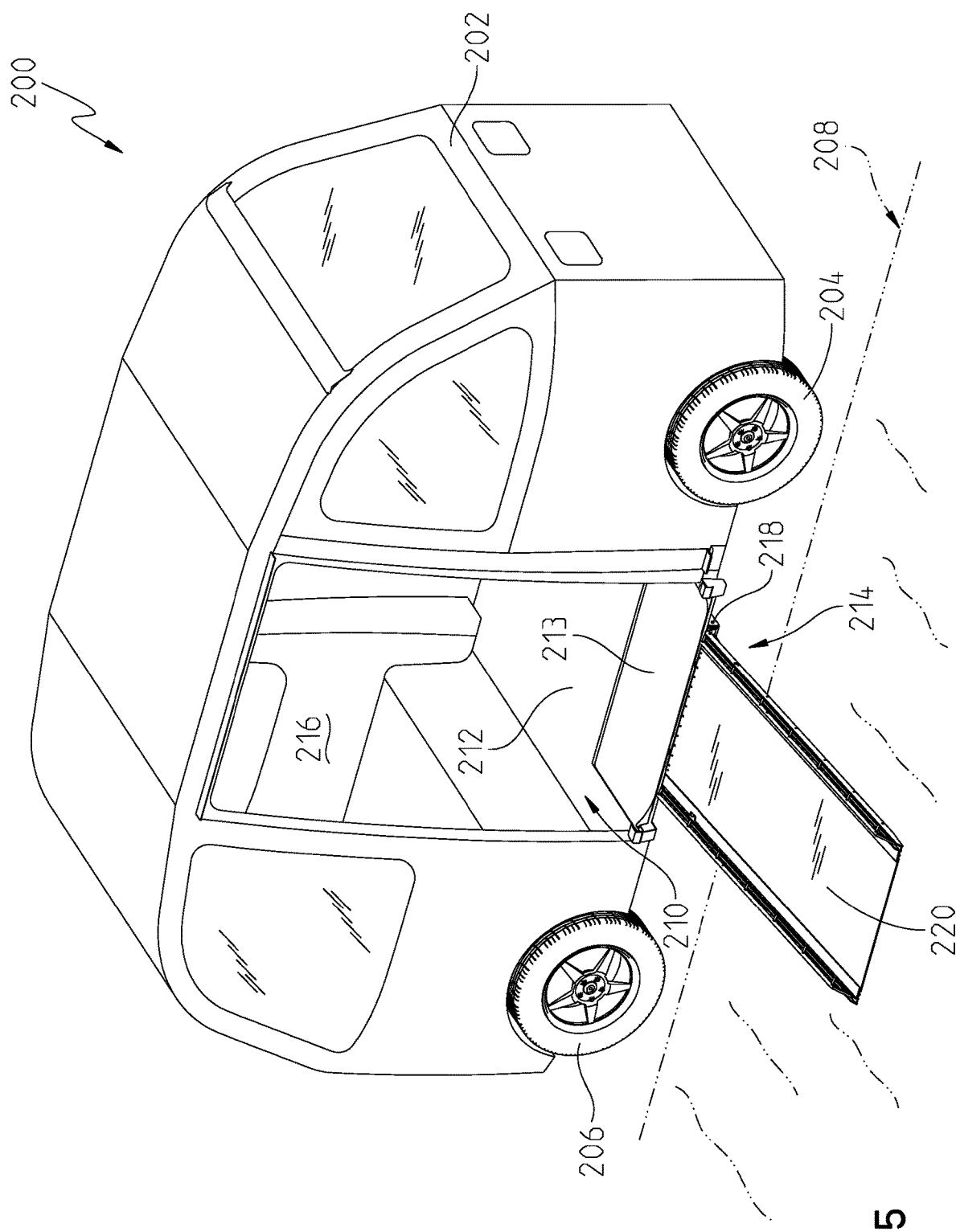
FIG. 5 is a perspective view of a passenger vehicle including a movable ramp.

In the illustrative embodiment shown in FIG. 5, the vehicle 200 includes a unibody construction, but other vehicles having a frame on body construction are also included in the present disclosure. Consequently, the use of vehicle herein includes all types and kinds of vehicles with a body on frame construction, a unibody construction, or other constructions. In addition, while the passenger van 200 is illustrated in FIG. 5, the present disclosure is directed to all passenger vehicles carrying one or more passengers including, but not limited to, a bus, motor coach, sport-utility vehicle, truck, taxi, ambulance, or passenger car.

The vehicle 200 includes a frame or chassis 202 coupled to a first pair of wheels 204 and a second pair wheels 206 that propel the vehicle 200 along a ground surface 208. In the illustrative embodiment, the vehicle is shown as a bi-directional vehicle; however, it should be appreciated that in other examples, the vehicle may be one of any number of vehicles suitable for use with a ramp assembly 214 described below. A first passenger opening 210 is located between the first pair wheels 204 and the second pair of wheels 206, and provides access to a passenger for sitting or standing in the vehicle 200. The passenger opening 210 may be modified to increase the size of the opening 210 to provide access, for example, to a passenger seated in a wheelchair to enter and exit the vehicle 200. The vehicle 200 may include a conventional floor 212 extending throughout the vehicle 200 to support passengers and other objects traveling in the vehicle 200.

As shown in FIG. 5, the vehicle 200 may be further modified to include the ramp assembly 214 which provides rolling access of a wheelchair from the ground surface 208 into an interior 216 of the vehicle 200. Prior to deployment, the ramp assembly 214 is positioned adjacent the opening 210 and beneath the conventional floor 212 of the vehicle 200. In other examples, prior to deployment, the ramp assembly 214 is positioned partially beneath a modified portion 213 of the conventional floor 212, and the modified portion 213 is flush with the remainder of the conventional floor 212. In other examples, the modified portion 213 may be sloped such that at least one side of the modified portion 113 is flush with the conventional floor 212. In reference to the ramp 120, the phrase "flush with the conventional floor" is meant to cover each illustrative example of a conventional and/or modified-conventional floor described herein. Additionally, as used herein "beneath" means directly underneath while "below" means at a lower height but not necessarily underneath.

Figure 6A:
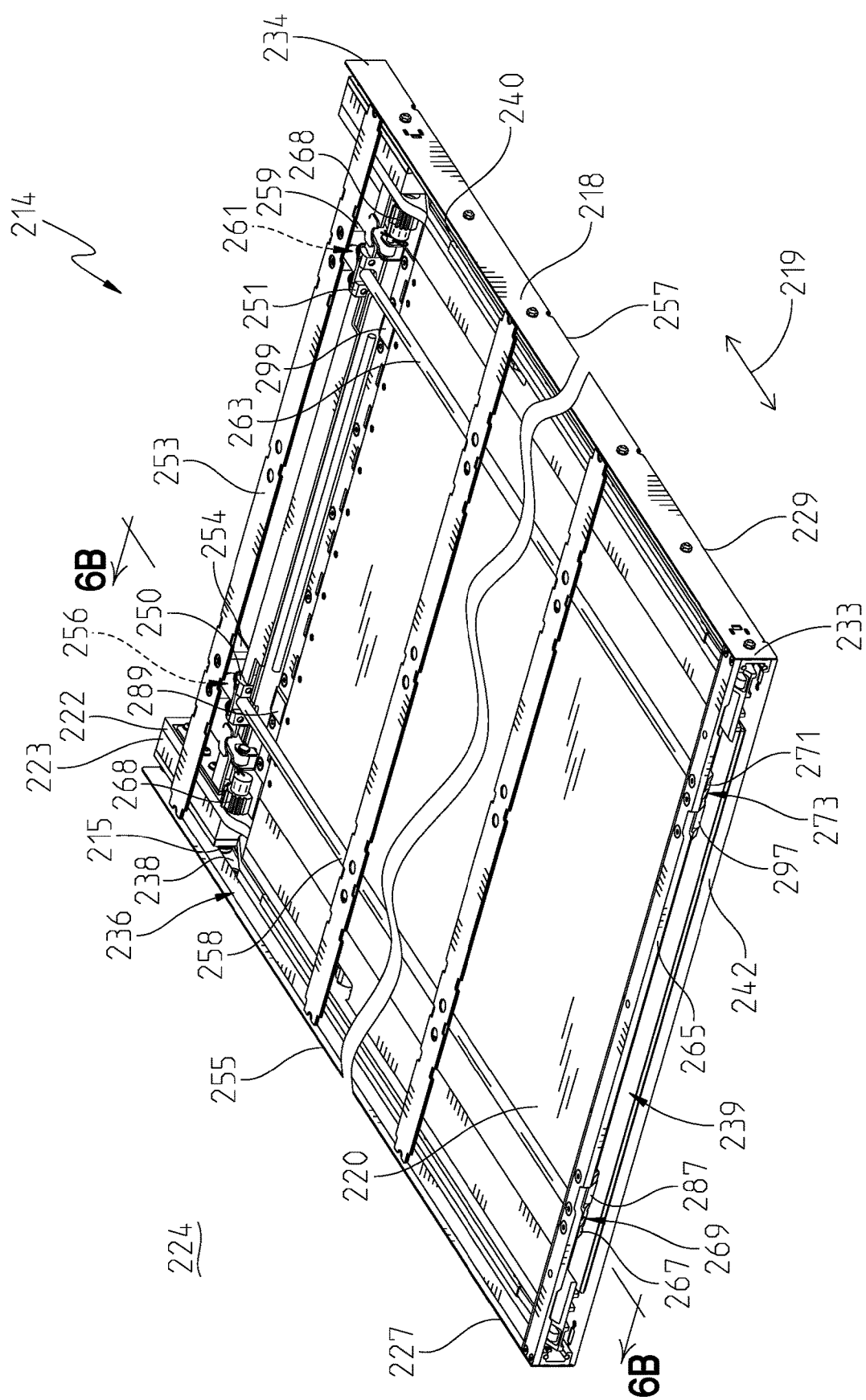
FIG. 6A is a perspective view of a ramp assembly showing a ramp in a stowed position beneath a conventional floor of the passenger vehicle.
Figure 6B:
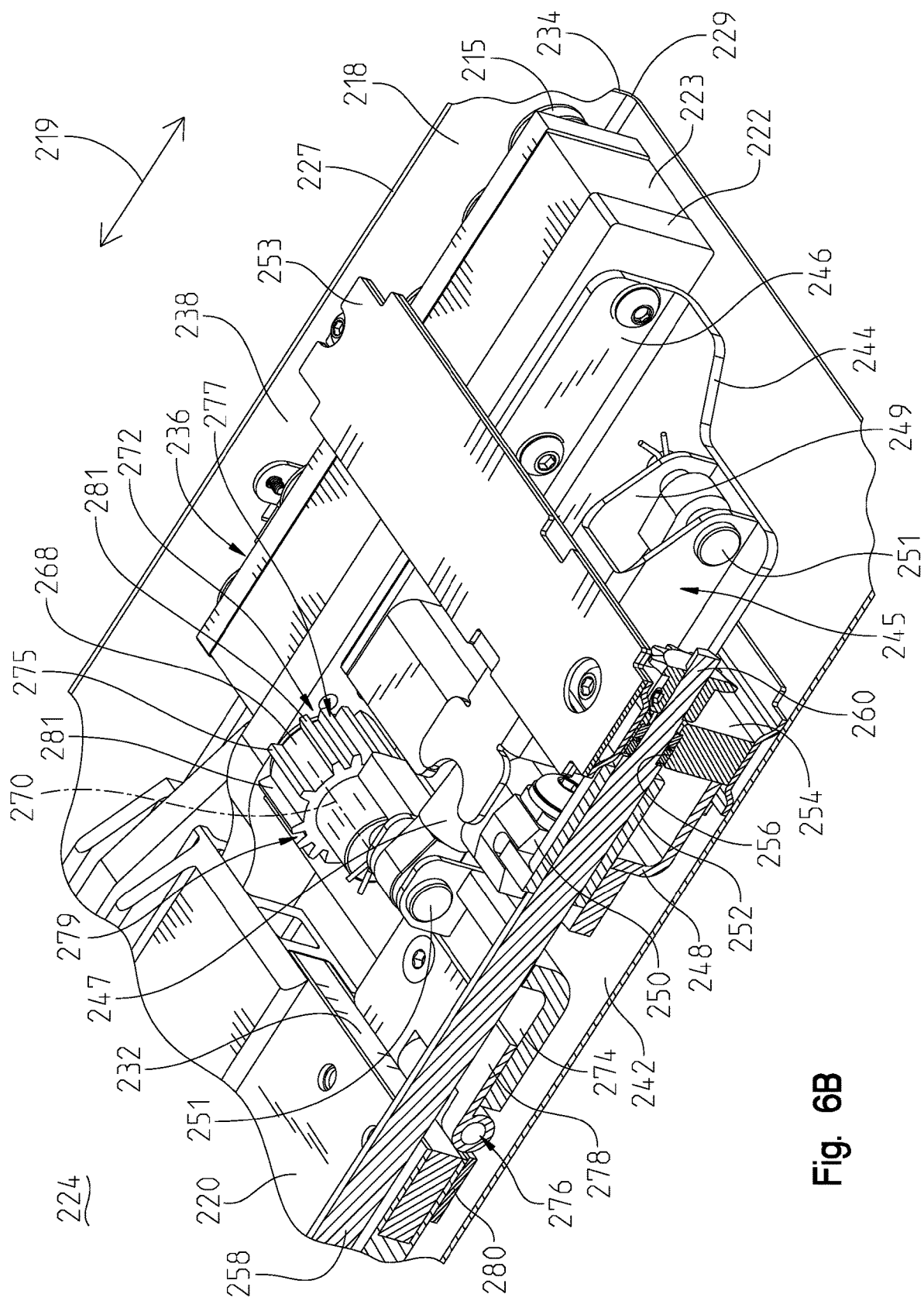
FIG. 6B is a partial cross-section view of the ramp assembly of FIG. 6A showing the ramp engaged with a track system of a frame.

As shown in FIGS. 6A-B, the ramp assembly 214 includes a frame 218, a ramp 220 movable relative to the frame 218, and a drive block 222 coupled between the frame 218 and the ramp 220. The drive block may translate (i.e., slide) to force the ramp 220 to slide relative to the frame 218. As will be described below in greater detail below, the ramp 220 is movable between several positions including a stowed position 224, a lowered position 226, and a raised position 228. As suggested by FIGS. 6A-B, in the stowed position 224, the ramp 220 is positioned in the interior 216 the vehicle 200 and beneath the conventional floor 212. As suggested by FIGS. 7A-B, in the lowered position 226, the ramp 220 is positioned outside the vehicle 200 and a rear end 232 of the ramp 220 is positioned below the conventional floor 212. As suggested by FIGS. 8A-B, in the raised position 228, the ramp 220 is positioned outside the vehicle 200 and the rear end 232 of the ramp 220 is positioned flush with the conventional floor 212 while a front end 231 of the ramp 220 rests on the ground 208.

Referring now to FIGS. 6A-B, the frame 218 includes a top edge 227, a bottom edge 229, a front end 233, a rear end 234, and a track system 236. The rear end 234 of the frame 218 is spaced longitudinally apart from the front end 233, and the track system 236 extends longitudinally between the front end 233 and the rear end 234 of the frame 218. The longitudinal direction is indicated by arrow 219. The track system 236 includes a first-side track 238, a second-side track 240, and a frame floor 242 extending between the first-side track 238 and the second-side track 240. The frame floor 242 is shown in FIG. 6B, and the ramp 220 eclipses the frame floor 242 in FIG. 6A.

An opening 239 is defined at the front end 233 of the frame 218 between the first-side track 238 and the second-side track 240. The ramp 220 may pass through the opening 239 as the ramp 220 is moved from the stowed position 224 to the lowered position 226. As such, the opening 239 is sized to receive the ramp 220 and facilitate passage of the ramp 220 therethrough. In some embodiments, the frame floor 242 supports the ramp 220 as the ramp 220 is moved between the stowed position 224 and the lowered position 226. It should be understood that in the illustrative embodiment the first-side track 238 and the second-side track 240 are a mirror image of one another and are otherwise identical such that description of a side track herein applies equally to both the first-side track 238 and the second-side track 240 of the track system 236.

In some embodiments, the ramp assembly 214 includes rollers 215 sized and shaped to be positioned within and supported by the first-side track 238. The ramp assembly 214 also includes a spacer block 223 coupled between the drive block 222 and the rollers 215. The rollers 215 are pivotally coupled to the spacer block for rotational movement relative to the spacer block 223 and the drive block 222. Rolling movement of the rollers 215 along the first-side track 238 facilitates sliding movement of the ramp 220 relative to the frame 218.

As shown in FIG. 6B, in some embodiments, the ramp assembly 214 includes an elongated mount 244 fixed to the drive block 222 for sliding movement with the drive block 222 relative to the frame 218 in the longitudinal direction 219. In such embodiments, the elongated mount 244 is coupled to and extends from the drive block 222 away from the first-side track 238 toward the second-side track 240. The elongated mount 244 includes a first portion 246 coupled to the drive block 222 and a second portion 248 coupled to a first casing mount 250. As shown in FIGS. 6A-B, the first casing mount 250 is coupled to and supports a first threaded casing 252. In some embodiments, one or more of the first threaded casing 252, the casing mount 250, and the elongated mount 244 are formed as a single monolithic component. In other embodiments, each piece may be formed separately and later assembled. The ramp assembly 214 also includes a first support bracket 254 including a first bearing 256 formed therein.

As shown in FIG. 6A many components of the ramp assembly 214 have a mirror image counterpart. For example, the ramp assembly 214 includes a second casing mount 251 coupled to and supporting a second threaded casing. Additionally, the ramp assembly 214 includes a second support bracket 259 including a second bearing 261 formed therein. It should be appreciated that the description of any mirror image component applies equally to its counterpart. A cross bar 253 is positioned above and coupled to the first support bracket 254 and the second support bracket 259. The cross bar 253 is fixed to the frame 218, positioned at the top edge 227 of the frame 218, and extends transversely across the frame 218 perpendicular to the longitudinal direction 219. The cross bar 253 is one of a plurality of cross bars configured to support the conventional floor 212 or modified portion thereof 213 above the internal components of the ramp assembly 214.

Referring still to FIGS. 6A-B, the ramp assembly 214 further includes a first threaded rod 258 extending from the front end of the frame 218 to the rear end of the frame 218. The first threaded rod 258 includes a first end 260 with a portion thereof positioned in the first bearing 256. The first bearing 256 is configured to support and facilitate rotation of the first threaded-rod 258. The first end 260 of the first threaded rod 258 may be coupled to a rotational power supply (not shown) to cause rotation of the threaded rod 258. The first threaded rod 258 may be positioned within and threadingly coupled to the first threaded casing 252, such that rotation of the first threaded rod 258 causes the first threaded casing 252 to translate longitudinally along the first threaded rod 258. Longitudinal movement of the first threaded casing 252 causes sliding movement of the drive block 222, which is indirectly coupled to the first threaded casing 252 as described above.

The ramp assembly 214 further includes a second threaded rod 263 extending the front end 233 of the frame 218 to the rear end 234 of the frame 218. The second threaded rod 263 includes a first end with a portion thereof positioned in the second bearing 261. The second bearing 261 is configured to support and facilitate rotation of the second threaded rod 263. The first end of the second threaded rod 263 may be coupled to a rotational power supply (not shown) to cause rotation of the second threaded rod 263. The second threaded rod 263 may be positioned within and threadingly coupled to a second threaded casing, such that rotation of the second threaded rod 263 causes the second threaded casing to translate longitudinally along the second threaded rod 263. The first and second threaded rods 258, 263 may be coupled to the same rotational power supply and are rotated at the same speed to move their respective threaded casings and drive blocks at the same speed longitudinally along the track system 236, which ultimately moves the ramp 220 in a smooth fashion relative to the frame 218.

Figure 7B:
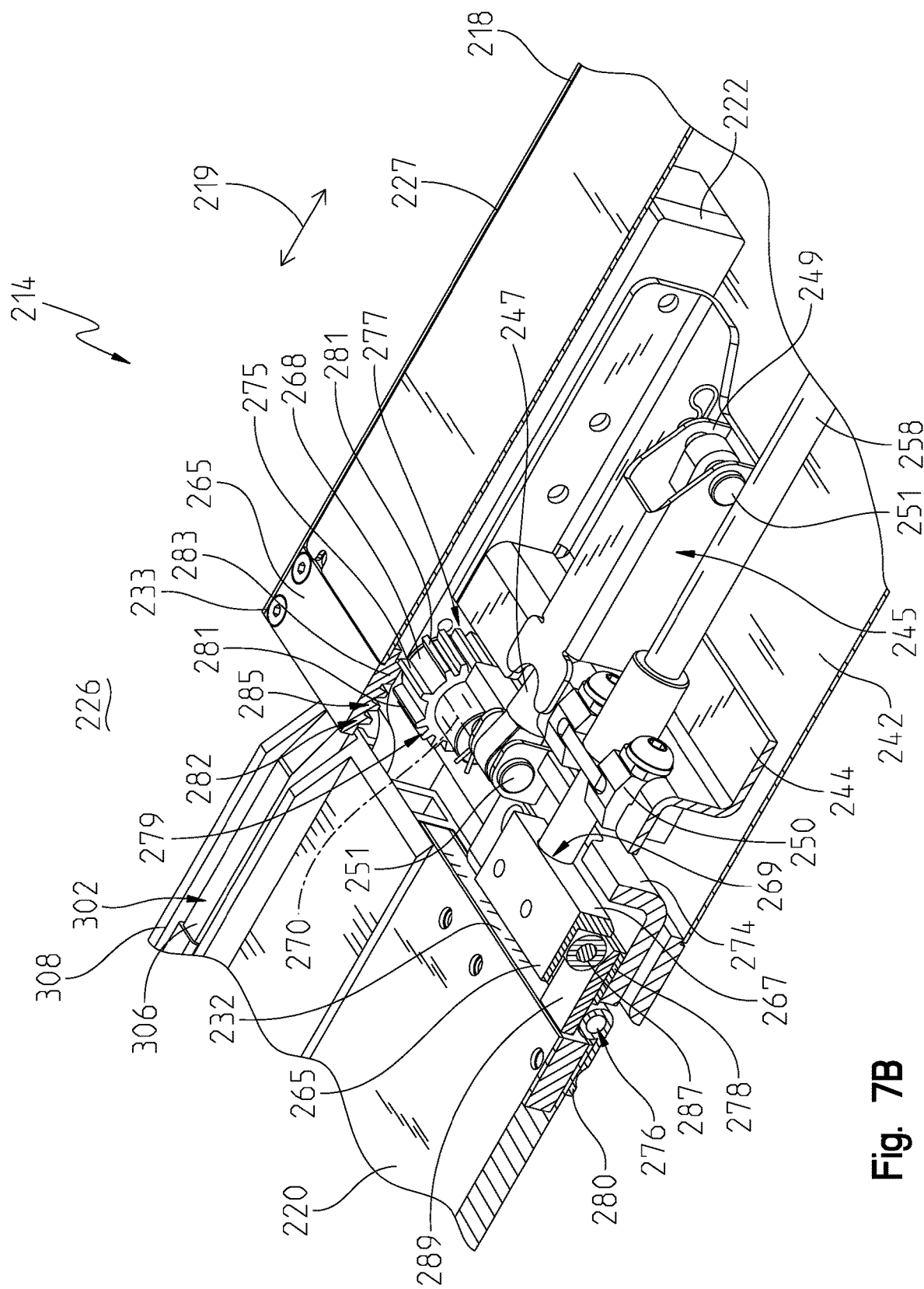
FIG. 7B is a partial cross-section view of the ramp assembly of FIG. 7A showing a toothed-wheel in contact with a toothed-bar of the frame.

As shown in FIGS. 6A and 7A-B, the frame 218 includes a second cross bar 265 positioned at the front end 233 of the frame 218. Like the first cross bar 253, the second cross bar cross bar 265 is fixed to the frame 218, positioned at the top edge 227 of the frame 218, and extends transversely across the frame 218. The second cross bar 265 cooperates with the frame floor 242, the first-side track 238, and the second-side track 240 to define the opening 239.

The second cross bar 265 includes a first support mount 267 having a bearing 269 formed therein and a second support mount 271 having a bearing 273 formed therein. The first threaded rod 258 includes a second end positioned in the bearing 269. The bearing 269 is configured to support and facilitate rotation of the first threaded rod 258, which ultimately causes sliding movement of the drive block 222 relative to the frame 218 as described above. The second threaded rod 263 includes a second end positioned in the bearing 273. The bearing 273 is configured to support and facilitate rotation of the second threaded rod 263, which ultimately causes sliding movement of the respective drive block, as described above. Sliding movement of the drive blocks causes sliding movement of the ramp 220 relative to the frame 218, as described above.

As shown in FIG. 6B, the ramp assembly 214 includes a wheel 268 coupled to the drive block 222 for rotation about a longitudinal axis 270 of the wheel 268. In the illustrative embodiment, the wheel 268 is a toothed wheel, meaning that the wheel 268 has a plurality of projections 272 extending away from the center of the wheel 268.

Figure 6C:
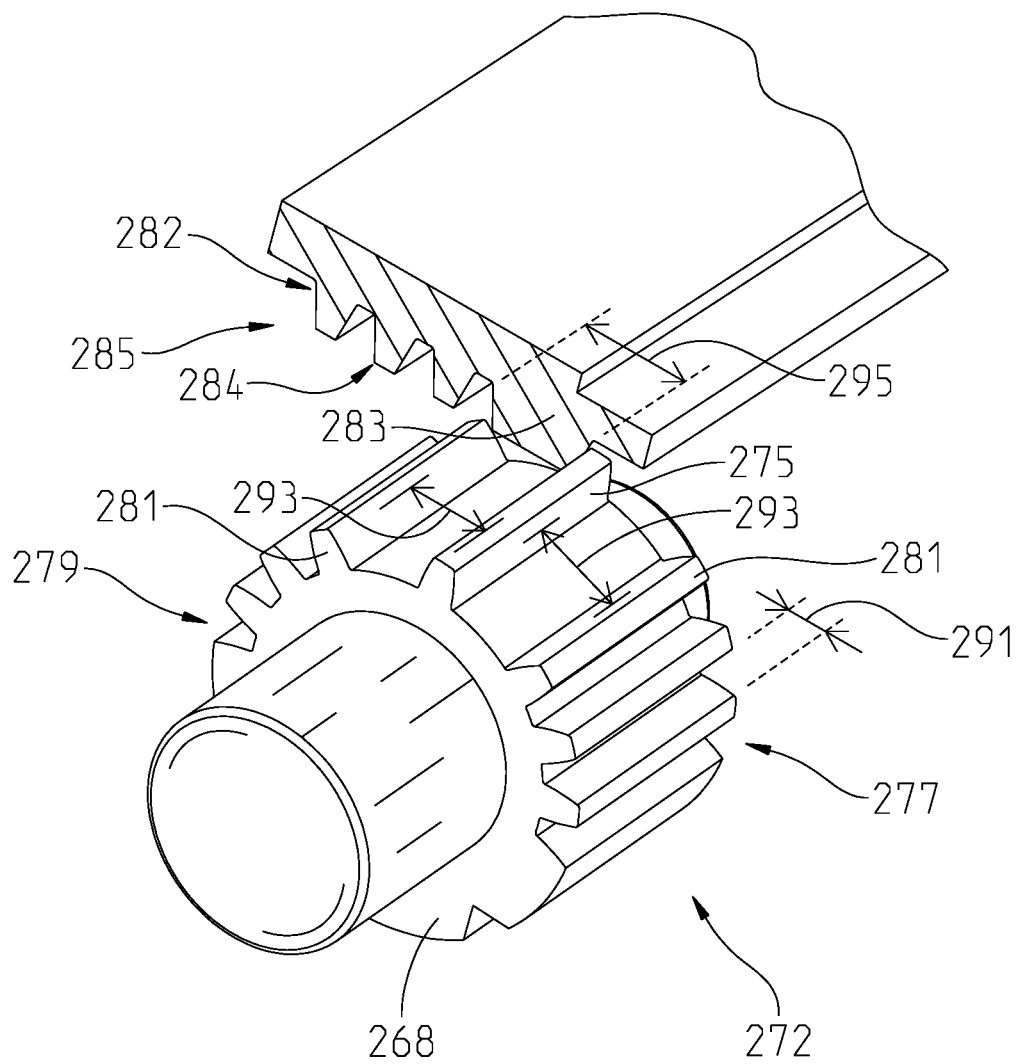
FIG. 6C is a cut away perspective view of cogs of a ramp assembly including a toothed bar and a toothed wheel.

As shown in FIG. 6C, the plurality of projections 272 includes a keystone projection 275, a first plurality of subordinate projections 277 positioned clockwise of the keystone projection 275, and second plurality of subordinate projections 279 positioned counter-clockwise of the keystone projection 275. Each subordinate projection is spaced apart a first distance 291 from an adjacent subordinate projection. The first and second pluralities of subordinate projections 277, 279 each include a first projection 281 positioned nearest to the keystone projection 275. Each first projection 281 is spaced apart from the keystone projection 275 a second distance 293 that is greater than the first distance 291. As shown in FIG. 6A, the ramp assembly 214 includes two wheels 268. In the illustrative embodiment, the two wheels 268 are identical to one another and not mirror image components. The existence of two pluralities of subordinate projections, e.g., one on each side of the keystone projection 275, allows the same wheel 268 to be positioned on both sides of the ramp assembly 214. Thus, only one configuration of a toothed wheel is required to be manufactured to assemble the ramp assembly 214.

Referring again to FIG. 6B, in the illustrative embodiment, the wheel 268 is fixed to an elongated wheel mount 274. The elongated wheel mount 274 is rotatable with the wheel 268. In some embodiments, the wheel 268 and the elongated wheel mount 274 may be formed as a single monolithic component. In other embodiments, each piece may be formed separately and later assembled. In either case, the elongated wheel mount 274 is coupled to a hinge 276. As shown in FIG. 6B, the hinge 276 includes a first end 278 coupled to the elongated wheel mount 274 and a second end 280 coupled to the rear end 232 of the ramp 220. The first end 278 of the hinge 276 is configured to pivot relative to the second end 280 of the hinge 276. As a result, the ramp 220 is pivotally coupled to the wheel 268. This arrangement also facilitates sliding movement of the ramp 220 relative to the frame 218. For example, when the hinge 276 is in an opened position as shown in FIG. 6B, the hinge 276 cooperates with the elongated wheel mount 274 and the wheel 268 to couple the ramp 220 to the drive block 222. Thus, longitudinal movement of the drive block 222 may urge (i.e., push or pull) the ramp 220 in the longitudinal direction 219 relative to the frame 218.

As shown in FIG. 6A, when the ramp 220 is in the stowed position 224, the wheel 268 is spaced apart from the front end 233 of the frame 218. As the wheel 268 is moved longitudinally from the rear end 234 of the frame 218 toward the front end 233 of the frame 218, the ramp 220 is moved from the stowed position 224 shown in FIGS. 6A-B to the lowered position 226 shown in FIGS. 7A-B. As suggested in FIGS. 7A-B, when the ramp 220 is in the lowered position 226, the wheel 268 is positioned at the front end 233 of the frame 218, and the rear end 232 of the ramp 220 is positioned below the conventional floor 212 or the modified portion thereof 213.

FIG. 7B shows the second cross bar 265; however, a portion of the cross bar 265 has been cut away to show a toothed portion 282 formed in the cross bar 265. The toothed portion 282 includes a plurality of projections 284 (see FIG. 6C). In some embodiments, the toothed portion 282 and the cross bar 265 may be a signal monolithic component. In some embodiments, the toothed portion 282 may be formed in a bar or other component that is distinct from and merely coupled to the cross bar 265. At times, the toothed portion 282 may be referred to as a toothed bar.

In the illustrative embodiment, the toothed portion 282 includes a primary projection 283 and a plurality of secondary projections 285. When the tooth portion 282 is formed in the cross bar 265 and the cross bar 265 is coupled to the frame 218 as illustratively show in FIG. 7B, the plurality of secondary projections 285 are positioned forward of the primary projection 283. The primary projection 283 has a width 295 that is substantially equal to the second distance 293 defined between the keystone projection 275 and the first subordinate projections 281.

As shown in FIG. 7B, when the ramp 220 is in the lowered position 226, the keystone projection 275 of the wheel 268 is in contact with the primary projection 283 of the cross bar 265. As the drive block 222 continues to slide longitudinally toward the front end 233 of the frame 218, the plurality of subordinate projections 279 of the wheel 268 engage with each of the plurality of secondary projections 285 of the cross bar 265 to cause rotation of the wheel 268 about the longitudinal axis 270. When the wheel 268 and the wheel mount 274 pivot relative to the drive block 222, the hinge 276 moves between an opened position (see FIG. 7B) and a folded position (see FIG. 8B) to raise and lower the ramp 220.

Referring still to FIG. 7B, the ramp assembly 214 further includes a roller 287 supported above the frame floor 242 by the first support mount 267. The ramp assembly 214 also includes a pad 289 coupled to the first end 278 of the hinge 276 and aligned with the roller 287. When the ramp 220 is in the lowered position 226 (or stowed position 224), an exposed surface of the pad 289 faces away from the frame floor 242. As best shown in FIG. 6A, it should be appreciated that the ramp assembly 214 includes a second roller 297 supported above the frame floor 242 by the second support mount 271. The ramp assembly 214 also includes a second pad 299 coupled to the first end 278 of the hinge 276 and aligned with the roller 297. When the ramp 220 is in the lowered position 226 (or stowed position 224), an exposed surface of the pad 299 faces away from the frame floor 242.

As the ramp 220 is moved from the stowed position 224 to the lowered position 226 the ramp 220 becomes cantilevered, extending beyond the forward end 233 of the frame 218. Therefore, gravity has a tendency to force the front end 231 of the ramp 220 downward, thus, the rearward end 232 of the ramp 220 is forced upward. To counteract these forces, the pads 289, 299 contact the rollers 287, 297 to limit upward and downward movement of the ramp 220 as the ramp is moved from the stowed position 224 to the lowered position 226.

As shown in FIG. 7B, the ramp 220 further includes support mechanism 245 coupled between the elongated mount 244 and the elongated wheel mount 274. As shown in the illustrative embodiment, the support mechanism 245 may include, for example, a gas spring 247. In any case, the support mechanism 245 is fixed at a first end to the elongated mount 244 and at a second end to the elongated wheel mount 274 to further prevent upward and downward movement of the ramp 220 when the ramp 220 is moved from the stowed position 224 to the lowered position 226. In the illustrative embodiment, the gas spring 247 is positioned in a support mechanism housing 249. Pins 251 extend through ends of the gas spring 247 and ends of housing 249 to couple the gas spring 247 to the housing 249.

Figure 8B:
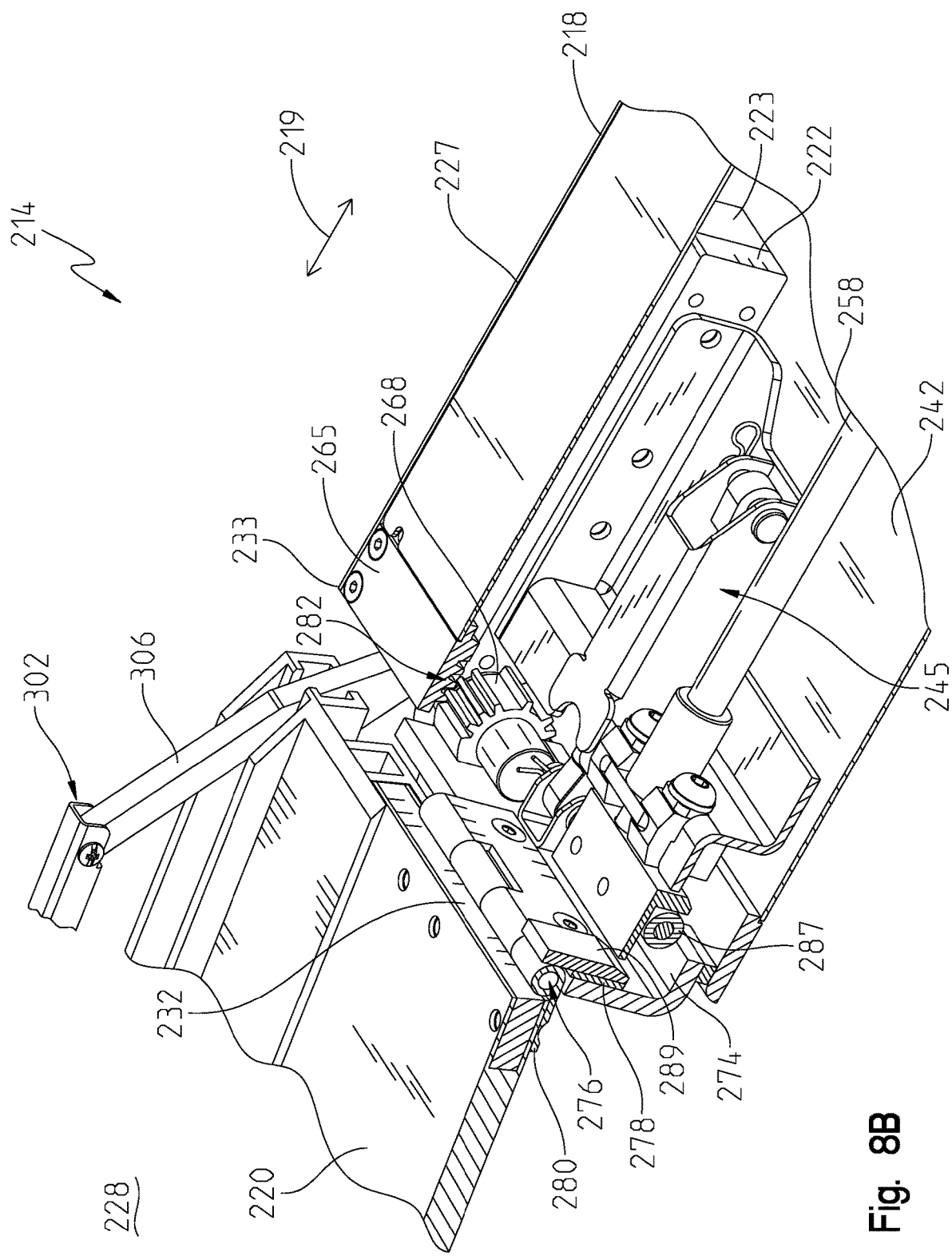
FIG. 8B is a partial cross-section view of the ramp assembly of FIG. 8A showing the toothed wheel rotated relative to the toothed wheel in FIG. 7B.

FIGS. 1 and 8A-B show the ramp in the raised position 228. As shown in FIG. 1, in the raised position 228, the ramp 220 is positioned outside the motor vehicle 200 and the rear end 232 of the ramp 220 is positioned flush with the conventional floor 212 or the modified portion thereof 213. Referring again to FIGS. 8A-B, when the ramp 220 is in the raised position 228, the wheel 268 is positioned at the front end 233 of the frame 218 and rotated relative to the position of the wheel 268 when the ramp 220 is in the lowered position 226. In other words, the wheel 268 is rotatable between a first position in which the ramp 220 is in the lowered position 226 (or the stowed position 224) and a second position in which the ramp 220 is in the raised position 228. When the wheel 268 is in the first position, the rear end 232 of the ramp 120 is positioned below the top edge 227 of the frame 218, and when the wheel 268 is in the second position, the rear end 232 of the ramp 120 is positioned above the top edge 227 of the frame 218 (flush with the conventional floor 212).

In some embodiments, the wheel 268 is configured to rotate approximately 90 degrees as the ramp 220 is moved between the lowered position 226 and the raised position 228. As the wheel 268 is rotated 90 degrees, the first end 278 of the hinge 276 moves between: (i) a first position in which the first end 278 of the hinge 276 extends in a plane substantially parallel to the frame floor 242, and (ii) a second position in which the first end 278 of the hinge 276 extends in a plane that is substantially perpendicular to the frame floor 242.

While the description above has described the toothed wheel 268 as coupled to the drive block 222 and the toothed portion 282 as formed in or coupled to the cross bar 265, it should be appreciated that the location of the of toothed wheel 268 and the toothed portion 282 may be reversed. For example, in illustrative embodiments, the toothed portion 282 may be formed in or otherwise fixed to the drive block 222 for sliding movement therewith, and the toothed wheel 268 may be pivotally coupled to the frame 218 and fixed in a location relative to the frame 218. As the drive block 222 slides longitudinally toward the front end 233 of the frame 218, the toothed portion 282 slides into contact with the toothed wheel 268. As the drive block 222 continues to slide longitudinally toward the front end 233 of the frame 218, each of the projections 284 of the toothed portion 282 engage with each of the plurality of projections 272 of the toothed wheel 268 to cause rotation of the toothed wheel 268. The toothed wheel 268 and the toothed bar 282 are shown generally in FIG. 6C. In such an embodiment, rotation of the toothed wheel 268 causes raising and lowing the ramp 220 relative to the frame 218, as described above.

The term "cog" is meant to include both a wheel having a series of projections and a bar having a series of projections. As used herein a cog is a wheel or bar that transfers motion by engaging with projections on another wheel or bar. In the illustrative embodiments shown herein, a first cog is coupled to the frame 218 at a fixed location on the frame 218, and a second cog is coupled to the ramp 220 for sliding movement with the ramp 220. The wheel 268 is rotatable relative to the component to which it is coupled. This facilitates movement of the ramp 220 between the lowered position 226 and the raised position 228.

Referring now to FIG. 8A, a first side rail 302 and a second side rail 304 of the ramp assembly 214 are shown. In FIG. 8A, the side rails 302, 304 have been lifted out of their respective side rail housings 308, 310. As shown FIG. 7A, the side rails 302, 304 are in a collapse position within the housings 308, 310 when the ramp 220 is in the lowered position 226 (or the stowed position 224). As shown in FIG. 8A, the side rails 302, 304 are in a lifted position when the ramp 220 is in the raised position 228. As the ramp 220 moves from the lowered position 226 to the raised position 228, the spacer block 223 and the cross bar 265 contact a lever 306 of the side rail 302 to cause rotation of the lever 306 relative to the ramp 220. Contact by the spacer block 223 and the cross bar 265 forces the side rail 302 to move to the lifted position, as described in greater detail below.

Figure 9:
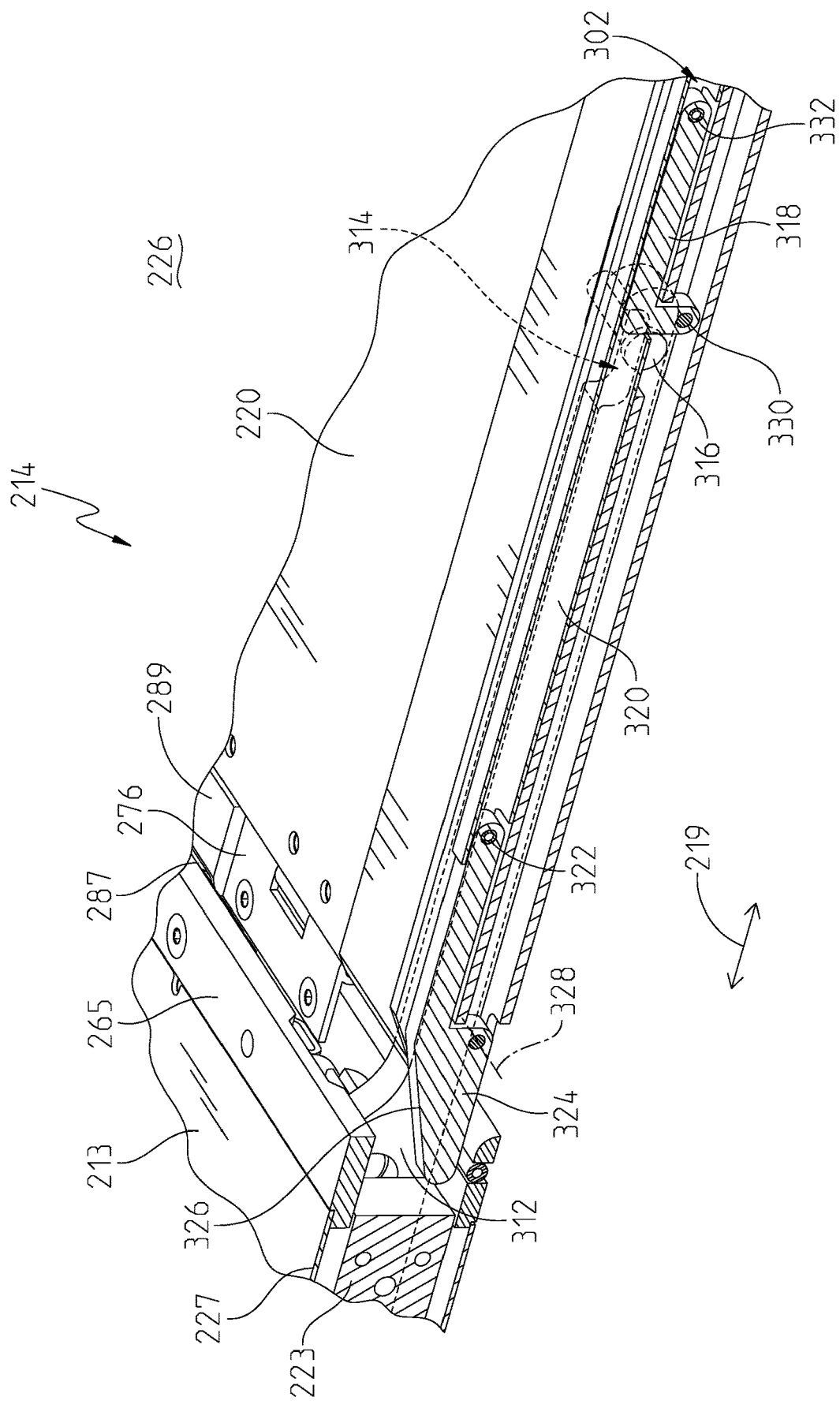
FIG. 9 is a partial cross-section view of a side rail of the ramp assembly showing the side rail in a collapsed position.
Figure 10:
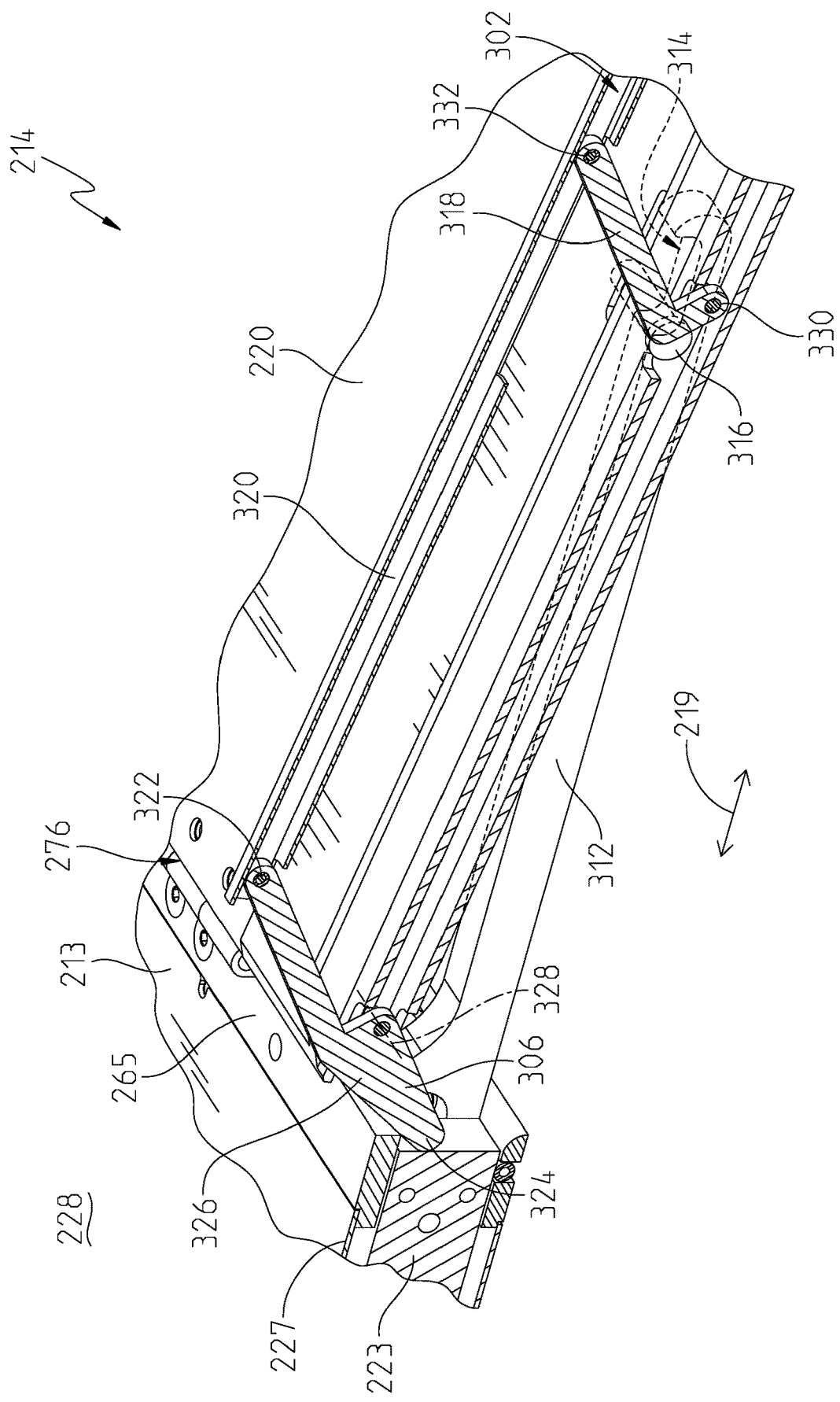
FIG. 10 is a partial cross-section view of the side rail of the ramp assembly showing the side rail in a lifted position.

Referring now to FIGS. 9 and 10, the side rail 302 is shown; however, it should be appreciated that the side rails 302 and 304 are identical such that any description of the side rail 302 applies equally to the side rail 304. FIG. 9 shows the side rail 302 in the collapse position, and FIG. 10 shows the side rail 302 in the lifted position.

As shown in FIGS. 9 and 10, the ramp assembly 214 includes a support arm 312 coupled to the drive block 222 for sliding movement therewith. The support arm 312 includes a pocket 314. The ramp 220 includes a weight-bearing pin 316 coupled to the ramp 220 and configured to rest in the pocket 314 of the support arm 312. The weight-bearing pin 316 may also travel longitudinally within the pocket 314. When the ramp 220 is in the lowered position 226 (and the stowed position 224) the weight-bearing pin 316 is positioned at a front end of the pocket 314. When the ramp 220 is in the raised position 228, the weight-being pin 316 is positioned at a rearward end of the pocket 314. As the ramp 220 is moved from the stowed position 224 to the lowered position 226 the ramp 220 becomes cantilevered, extending beyond the forward end 233 of the frame 218. Therefore, gravity has a tendency to force the front end 231 of the ramp 220 downward, thus, the rearward end 232 of the ramp 220 is forced upward. To counteract these forces, the support arm 312 is configured to support the weight-bearing pin 316 (and the ramp 220) above the ground 208.

As shown in FIGS. 9 and 10, the side rail 302 includes the lever 306, a linkage bar 318, and a runner 320. The lever 306 includes a first end 322 pivotally coupled to the runner 320 and a second end or free end 324 positioned opposite the first end 322. The lever 306 further includes a ramped portion 326 extending upwardly and away from the free end 324. The lever 306 is pivotally coupled to the ramp 220 at a rotational axis 328 of the lever 306. The rotational axis 328 is positioned between the first end 322 and the second end 324 of the lever 306. When the ramp 220 moves from the lowered position 326 to the raised position 328, the spacer block 223 and the cross bar 265 contact the free end 324 and the ramped portion 326 to cause rotation of the lever 306. As the lever 306 rotates, the lever 306 pulls the runner 320 out from the housing 308 and moves the side rail 302 to the lifted position. In the illustrative embodiment, the linkage bar 318 is an L-shaped bar having a first end 330 pivotally coupled to the ramp 220 and a second end 332 pivotally coupled to the runner 320. When the runner 320 is lifted out from the housing 308, the runner 320 pulls the linkage bar 318 out from the housing 308 as well. The linkage bar 318 rotates about its first end 330 and second end 332 as the side rail 302 moves to the lifted position.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. For instance, the present disclosure is not limited to the modification of a purchased OEM vehicle, but can be incorporated into the OEM vehicle when manufactured. Further, this application is intended to cover such departures from the present disclosure as come within known or customary practice in the art to which this disclosure pertains and which fall within the limits of the appended claims.

The invention claimed is:

1. A ramp assembly to accommodate a wheel-chaired passenger to enter or exit a motorized vehicle having a conventional floor, the ramp assembly comprising:
   a frame including a top edge, a bottom edge, a front end, a rear end spaced longitudinally apart from the front end, and a track system extending longitudinally between the front end and the rear end of the frame;
   a ramp slidably coupled to the frame and including a front end and a rear end;
   a drive block configured to move longitudinally along the track system;
   a wheel rotatably coupled to the drive block for rotation about an axis; and
   a hinge having a first end rotatable with the wheel and a second end pivotally coupled to the ramp, wherein rotation of the wheel causes the ramp to raise and lower relative to the wheel.

2. The ramp assembly of claim 1, wherein:
   the second end of the hinge is coupled to the rear end of the ramp.

3. The ramp assembly of claim 1, wherein the wheel is rotatable between:
   a first position in which the rear end of the ramp is positioned below the top edge of the frame, and
   a second position in which the rear end of the ramp is positioned above the top edge of the frame.

4. The ramp assembly of claim 1, wherein the ramp is movable between: (i) a stowed position in which the wheel is spaced apart from the front end of the frame, (ii) a lowered position in which the wheel is positioned at the front end of the frame, (iii) and a raised position in which the wheel is positioned at the front end of the frame and rotated relative to the wheel when the ramp is in the lowered position.

5. The ramp assembly of claim 4, wherein:
   in the stowed position the ramp is positioned inside the motorized vehicle and beneath the conventional floor,
   in the lowered position the ramp is positioned outside the motorized vehicle and the rear end of the ramp is positioned below the conventional floor, and
   in the raised position the ramp is positioned outside the motorized vehicle and the rear end of the ramp is positioned flush with the conventional floor.

6. The ramp assembly of claim 1, wherein the track system includes:
   a first-side track coupled to a first side of the frame,
   a second-side track spaced apart from the first-side track and coupled to a second side of the frame, and
   an opening defined between the first-side track and the second-side track sized to receive the ramp.

7. The ramp assembly of claim 6, further comprising:
   a cross bar coupled to the first side of the frame and the second side of the frame, wherein the cross bar cooperates with the first-side track and the second-side track to define the opening sized to receive the ramp.

8. The ramp assembly of claim 7, further comprising:
   a first bearing coupled to the cross bar;
   a second bearing positioned at the rear end of the frame;
   a threaded rod extending between and configured to rotate relative to the first bearing and the second bearing;
   and a threaded casing fixed relative to the drive block and configured to move longitudinally along the threaded rod during rotation of the threaded rod.

9. The ramp assembly of claim 7, wherein the wheel is rotatable between: a first position in which the rear end of the ramp is aligned with the opening, and a second position in which the rear end of the ramp is positioned above the opening.

10. A method of using the ramp assembly of claim 1 comprising:
    sliding the rear end of the ramp from the rear end to the front end of the frame that is positioned beneath the conventional floor; and
    adjusting a height of the rear end of the ramp relative to the frame from a first position in which the rear end of the ramp is below the conventional floor to a second position in which the rear end of the ramp is flush with the conventional floor.

11. The method of claim 10, wherein:
sliding the rear end of the ramp from the rear end to the front end of a frame includes engaging a first cog with a second cog; and
adjusting the height of the rear end of the ramp relative to the frame includes rotating the one of the first cog and second cog relative to the other of the first cog and the second cog.

12. A ramp assembly to accommodate a wheel-chaired passenger to enter or exit a motorized vehicle having a conventional floor, the ramp assembly comprising:
a frame including a top edge, a bottom edge, a front end, a rear end spaced longitudinally apart from the front end, and a track system extending longitudinally between the front end and the rear end of the frame;
a ramp slidably coupled to the frame and including a front end and a rear end;
a drive block configured to move longitudinally along the track system;
a wheel pivotally coupled to the ramp; wherein the wheel has a longitudinal axis and is rotatably coupled to the drive block for rotation about the longitudinal axis; and
a cross bar coupled to the front end of the frame,
wherein the cross bar includes a toothed portion; wherein the wheel is a toothed wheel configured to rotate about the longitudinal axis when engaged with the toothed portion of the cross bar.

13. The ramp assembly of claim 12, wherein the toothed wheel is rotatable between:
a first position in which the rear end of the ramp is positioned below the toothed portion, and
a second position in which the rear end of the ramp is positioned above the toothed portion.

14. A ramp assembly for a motorized vehicle having a conventional floor, the ramp assembly comprising:
a frame including a front end, a rear end spaced longitudinally apart from the front end, and a track system extending longitudinally between the front end and the rear end of the frame;
a ramp slidably coupled to the frame and including a front end and a rear end;
a drive block configured to translate longitudinally along the track system; a first cog coupled to the frame; and
a second cog coupled to the drive block for longitudinal movement therewith,
wherein one of the first cog and the second cog is a toothed wheel pivotally coupled to the frame or the drive block, and the other of the first cog and the second cog is a toothed bar configured to engage the toothed wheel to cause rotation of the toothed wheel;
further wherein the ramp is movable between: (i) a stowed position in which the second cog is spaced apart from the first cog, (ii) a lowered position in which the second cog is in contact with the first cog, (iii) and a raised position in which the second cog is in contact with the first cog and the toothed wheel is rotated relative to the toothed wheel when the ramp is in the lowered position.

15. The ramp assembly of claim 14, wherein the ramp is configured to be raised and lowered relative to the toothed wheel during rotation of the toothed wheel.

16. The ramp assembly of claim 14, wherein:
the track system includes a first-side track and a second-side track, and
the toothed wheel is rotatable between:
a first position in which the rear end of the ramp is positioned above the frame, and
a second position in which the rear end of the ramp is vertically aligned with an opening of the frame defined between the first-side track and the second-side track.

17. The ramp assembly of claim 14, wherein:
in the stowed position the ramp is positioned inside the motorized vehicle and beneath the conventional floor,
in the lowered position the rear end of the ramp is positioned below the conventional floor, and
in the raised position the ramp is positioned outside the motorized vehicle and the rear end of the ramp is positioned flush with the conventional floor.

18. A ramp assembly for a motorized vehicle having a conventional floor, the ramp assembly comprising:
a frame including a front end, a rear end spaced longitudinally apart from the front end, and a track system extending longitudinally between the front end and the rear end of the frame;
a ramp slidably coupled to the frame and including a front end and a rear end;
a drive block configured to translate longitudinally along the track system; a first cog coupled to the frame; and
a second cog coupled to the drive block for longitudinal movement therewith,
wherein one of the first cog and the second cog is a toothed wheel pivotally coupled to the frame or the drive block, and the other of the first cog and the second cog is a toothed bar configured to engage the toothed wheel to cause rotation of the toothed wheel;
further wherein the ramp is movable between: (i) a stowed position in which the second cog is spaced apart from the front end of the frame, (ii) a lowered position in which the second is positioned at the front end of the frame, (iii) and a raised position in which the second cog is positioned at the front end of the frame and the toothed wheel is rotated relative to the toothed wheel when the ramp is in the lowered position.

* * * * *